United States Patent
Schweinfurth

(10) Patent No.: US 12,118,421 B1
(45) Date of Patent: *Oct. 15, 2024

(54) SYSTEM AND METHOD FOR GENERATING DIGITAL CONTENT WITHIN AN AUGMENTED REALITY ENVIRONMENT

(71) Applicant: WALGREEN CO., Deerfield, IL (US)

(72) Inventor: Andrew Schweinfurth, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,527

(22) Filed: Sep. 27, 2023

Related U.S. Application Data

(63) Continuation of application No. 16/580,494, filed on Sep. 24, 2019, now Pat. No. 11,816,522, which is a continuation of application No. 16/203,142, filed on Nov. 28, 2018, now Pat. No. 10,467,518.

(51) Int. Cl.
| | |
|---|---|
| *G06K 19/06* | (2006.01) |
| *G06F 16/438* | (2019.01) |
| *G06F 16/44* | (2019.01) |
| *G06K 19/077* | (2006.01) |

(52) U.S. Cl.
CPC ..... *G06K 19/07758* (2013.01); *G06F 16/438* (2019.01); *G06F 16/444* (2019.01); *G06K 19/06028* (2013.01)

(58) Field of Classification Search
CPC ........ G06K 19/07758; G06K 19/06028; G06F 16/438; G06F 16/444
See application file for complete search history.

(56) References Cited

U.S. PATENT DOCUMENTS

| | | | |
|---|---|---|---|
| 6,526,158 B1 * | 2/2003 | Goldberg | G06F 16/58 707/E17.026 |
| 6,583,799 B1 * | 6/2003 | Manolis | G06F 16/50 715/838 |
| 6,628,417 B1 * | 9/2003 | Naito | G06F 3/122 358/1.15 |

(Continued)

FOREIGN PATENT DOCUMENTS

WO  WO-2018066737 A1  4/2018

*Primary Examiner* — Nay Tun
(74) *Attorney, Agent, or Firm* — MARSHALL, GERSTEIN & BORUN LLP; Randall G. Rueth

(57) ABSTRACT

A method of ordering tag prints on a graphical user interface (GUI) includes receiving a media selection in response to an upload selection, transmitting the media to a remote computing device, receiving a tag selection, transmitting the tag selection to the remote computing device, and displaying an order confirmation message. A computing system includes one or more processors and a memory including computer-executable instructions that, when executed by the one or more processors, cause the computing system to receive a user selection, transmit media to a remote computing device receive, a tag selection, transmit the tag selection to a remote computing device, and display a confirmation. A non-transitory computer readable medium storing program instructions that when executed, cause a computer system to receive a user selection, transmit media to a remote computing device receive, a tag selection, transmit the tag selection to a remote computing device, and display a confirmation.

20 Claims, 15 Drawing Sheets

(56) References Cited

U.S. PATENT DOCUMENTS

| | | | | |
|---|---|---|---|---|
| 6,646,754 B1* | 11/2003 | Redd | G03D 15/005 358/1.9 |
| 6,657,702 B1* | 12/2003 | Chui | H04N 1/603 358/487 |
| 6,943,866 B2* | 9/2005 | Redd | H04N 1/603 430/21 |
| 6,950,198 B1* | 9/2005 | Berarducci | G06Q 30/0601 705/26.1 |
| 6,959,147 B2* | 10/2005 | Manico | H04N 1/00132 396/311 |
| 7,146,575 B2* | 12/2006 | Manolis | H04N 1/603 715/838 |
| 7,277,124 B2* | 10/2007 | Yamagishi | H04N 1/00137 348/333.02 |
| 7,433,649 B2* | 10/2008 | Toulis | H04M 1/72412 455/434 |
| 7,634,065 B2* | 12/2009 | Fukunaga | H04M 3/38 715/717 |
| 8,799,829 B2* | 8/2014 | Grosz | G06F 3/04845 709/219 |
| 8,910,055 B2* | 12/2014 | Berger | G06Q 30/01 715/751 |
| 8,977,234 B2* | 3/2015 | Chava | H04Q 9/00 705/14.65 |
| 9,071,287 B2* | 6/2015 | Siddiqui | H04B 5/77 |
| 9,154,229 B2* | 10/2015 | Iizuka | H04B 10/116 |
| 9,280,515 B2 | 3/2016 | Gaede et al. | |
| 9,280,680 B2* | 3/2016 | Gibson | H04L 63/102 |
| 9,384,408 B2* | 7/2016 | Everingham | G06V 20/62 |
| 9,984,727 B2* | 5/2018 | Walters | G06K 19/0723 |
| 10,467,518 B1 | 11/2019 | Schweinfurth | |
| 11,816,522 B1* | 11/2023 | Schweinfurth | G06F 16/438 |
| 2002/0063889 A1* | 5/2002 | Takemoto | H04N 1/00188 358/1.6 |
| 2002/0071677 A1* | 6/2002 | Sumanaweera | H04N 1/00323 707/E17.026 |
| 2002/0191208 A1* | 12/2002 | Uemura | H04N 1/00132 358/1.14 |
| 2003/0081249 A1* | 5/2003 | Ahmad | H04N 1/00209 358/1.15 |
| 2003/0220995 A1* | 11/2003 | Hitaka | H04N 1/00188 709/201 |
| 2004/0001219 A1* | 1/2004 | Wen | G06Q 30/06 40/124.11 |
| 2004/0103217 A1* | 5/2004 | Kridner | G06F 16/955 707/E17.112 |
| 2004/0257611 A1* | 12/2004 | Kito | H04N 1/00175 358/1.15 |
| 2004/0260614 A1* | 12/2004 | Taratino | G06Q 40/00 705/26.8 |
| 2005/0057773 A1* | 3/2005 | Buck | H04N 1/00145 358/1.15 |
| 2005/0073717 A1* | 4/2005 | Arakawa | G06F 3/1288 358/1.15 |
| 2005/0270569 A1* | 12/2005 | Hayashi | H04N 1/00307 358/1.15 |
| 2005/0278230 A1* | 12/2005 | Shirasaka | H04W 4/24 705/26.1 |
| 2006/0007921 A1* | 1/2006 | Shimomura | H04M 3/493 370/352 |
| 2006/0224403 A1* | 10/2006 | Whitehouse | G07B 17/00508 705/411 |
| 2007/0086452 A1* | 4/2007 | Hikida | G06Q 30/0601 370/389 |
| 2008/0141108 A1* | 6/2008 | Matsuura | G06F 40/166 715/255 |
| 2008/0300996 A1* | 12/2008 | Fei | G06Q 30/0633 705/26.8 |
| 2010/0182436 A1* | 7/2010 | Boman | H04N 7/188 342/450 |
| 2010/0245901 A1* | 9/2010 | Kitaguchi | H04N 1/00164 358/1.15 |
| 2011/0279851 A1* | 11/2011 | Berger | G06Q 10/00 358/1.15 |
| 2012/0066613 A1* | 3/2012 | Berger | G06Q 30/01 715/751 |
| 2012/0177297 A1* | 7/2012 | Everingham | G06V 20/62 382/229 |
| 2012/0265758 A1* | 10/2012 | Han | G06F 16/48 707/E17.089 |
| 2012/0316995 A1* | 12/2012 | Davies | H04N 1/00164 705/26.81 |
| 2013/0036635 A1 | 2/2013 | Mayer et al. | |
| 2013/0333055 A1* | 12/2013 | Pallakoff | H04L 63/10 726/29 |
| 2014/0040065 A1* | 2/2014 | DuBois | G06Q 30/0621 705/26.5 |
| 2014/0067990 A1* | 3/2014 | Abdelhameed | G06F 16/972 709/213 |
| 2014/0086591 A1* | 3/2014 | Iizuka | H04B 10/116 398/128 |
| 2014/0113552 A1* | 4/2014 | Siddiqui | H04B 5/77 455/41.1 |
| 2014/0195921 A1* | 7/2014 | Grosz | G06Q 30/0631 715/738 |
| 2014/0337479 A1* | 11/2014 | Stangas | H04W 4/00 709/219 |
| 2015/0015919 A1* | 1/2015 | Anderson | A23G 3/28 358/3.27 |
| 2015/0220896 A1* | 8/2015 | Carr | G06Q 20/12 705/39 |
| 2015/0286832 A1* | 10/2015 | Gibson | G06F 16/381 726/28 |
| 2016/0019379 A1 | 1/2016 | Sadeh | |
| 2016/0150268 A1* | 5/2016 | Barablin | H04N 21/4882 725/37 |
| 2016/0261764 A1* | 9/2016 | Morais | H04N 1/00328 |
| 2017/0126926 A1* | 5/2017 | Saito | H04N 1/00344 |
| 2017/0192726 A1 | 7/2017 | Bhaskaran | |
| 2017/0367272 A1* | 12/2017 | Uglialoro | G06K 7/10297 |
| 2018/0219720 A1* | 8/2018 | Morita | G06F 3/1238 |
| 2018/0357594 A1* | 12/2018 | Rabibadhana | G06Q 10/087 |
| 2019/0156541 A1* | 5/2019 | Isgar | G06F 40/186 |
| 2019/0199979 A1* | 6/2019 | Abe | H04N 7/188 |
| 2019/0238547 A1 | 8/2019 | Milden et al. | |
| 2021/0382587 A1 | 12/2021 | Heikkinen et al. | |

* cited by examiner

SYSTEM AND METHOD FOR GENERATING DIGITAL CONTENT WITHIN AN AUGMENTED REALITY ENVIRONMENT

CROSS-REFERENCE TO RELATED APPLICATIONS

This application is a continuation of and claims the benefit of U.S. patent application Ser. No. 16/580,494, filed Sep. 24, 2019, which is a continuation of and claims the benefit of U.S. patent application Ser. No. 16/203,142, filed Nov. 28, 2018, entitled "SYSTEM AND METHOD FOR GENERATING DIGITAL CONTENT WITHIN AN AUGMENTED REALITY ENVIRONMENT," the entire contents of which are expressly incorporated by reference herein.

FIELD OF DISCLOSURE

The present disclosure generally relates to a system and method for storing and delivering media content, and more specifically relates to generating an identification tag, corresponding to media content, that when scanned enables the media content to be presented on a client device.

BACKGROUND

Electronic devices, such as smart phones and tablet devices, have become more ubiquitous as technology and device capability have improved. Existing electronic and digital technology has improved the quality, form, functionality, and applications of capturing, storing, sharing, and displaying image, video, audio, and other types of digital media content. In some instances, this digital content provides benefits over traditional forms of media, such as photographs, CDs, DVD, etc., because of the low cost of the electronic devices, the high quality of the captured digital content, and the flexibility of transferring/sharing the digital content.

While advancements in technology have diminished the need for individuals to be physically present at an event or location in order to participate in and/or experience the event/location, existing technology still fails to provide the authenticity of an event, experience, place, and/or other content. For example, watching a video of concert or sporting event does not provide the viewer the same ear-deafening and ground shaking experience as if the viewer had attended the concert/event in person. Additionally, a user's specific conditions and/or disabilities may prevent him/her from experiencing the content as it was intended to be experienced. For example, a visually impaired individual, such as a person who is color blind, cannot see a famous painting as it was intended to be seen by the painter.

Beyond the underlying quality of digital content, there are still a variety of issues that arise despite the large volume, wide array, and accessibility of digital content. While users may store their digital content on a stored medium, such as a disc or a solid state drive, and share the digital medium with others, such techniques can be expensive, cumbersome, and intrusive. Storing digital content requires a tremendous amount of memory, and often requires users constantly and closely monitor the availability of space on their devices. In instances in which digital content is stored locally on a user's device, a user is often forced to choose between which content to retain and which to delete because of the amount of storage the content consumes on the user's device. One solution to this problem, is to upload the content to a digital file hosting repository and/or to post the content to a social media platform. However, accessing remote content requires streaming or downloading the content, which can be time consuming, data transfer intensive, and expensive. Further, the user may not be able to control who accesses the uploaded content or how it is used after the content has been uploaded. In turn this can lead to privacy and intellectual property misappropriation issues.

Accordingly, a need exists for an improved and enhanced experience for users to capture, store, share, access, and experience digital content.

SUMMARY

The present application disclosure provides a system and method for generating digital content within an augmented reality environment.

In an embodiment, a computer-implemented method of ordering unique identification tag prints on a graphical user interface (GUI) of a client device includes receiving, via the GUI, a user selection of one or more digital media, in response to a user upload selection received via the GUI, transmitting the one or more digital media to a remote computing device, receiving, via the GUI, a user tag print selection, the user tag print selection including a size, a quantity, a location, or user contact information of the unique identification tag, transmitting the user tag print selection to the remote computing device, and displaying, on the GUI, a tag print order confirmation message.

In another embodiment, a computing system for generating a unique identification tag print includes one or more processors, and a memory including computer-executable instructions that, when executed by the one or more processors, cause the computing system to receive, via GUI, a user selection of one or more digital media, transmit the one or more digital media to a remote computing device in response to receiving a user upload selection via the GUI, receive, via the GUI, a user tag print selection, the user tag print selection including a size, a quantity, a location, or user contact information of a tag, transmit the user tag print selection to the remote computing device, and display, on the GUI, a tag print order confirmation message.

In yet another embodiment, a non-transitory computer readable medium storing program instructions that when executed, cause a computer system to receive, via a GUI, a user selection of one or more digital media, transmit the one or more digital media to a remote computing device in response to receiving a user upload selection via the GUI, receive, via the GUI, a user tag print selection, the user tag print selection including a size, a quantity, a location, or user contact information of a tag, transmit the user tag print selection to the remote computing device, and display, on the GUI, a tag print order confirmation message.

BRIEF DESCRIPTION OF DRAWINGS

The figures described below depict various aspects of the systems and methods disclosed herein. Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The present disclosure generally relates to a system and method for delivering media content and, more specifically relates to generating an identification tag, corresponding to media content, that when scanned enables the media content to be presented on a client destination device.

According to implementations, the systems and methods may support a dynamic, real-time or near-real-time communication, analysis, and processing of data. In particular, the systems and methods may generate an identification tag corresponding to uploaded media content, print a physical depiction of the identification tag, scan the identification tag using an identification tag scanner, analyze the identification tag to identify the uploaded media content associated with the identification tag, and present the media content associated with the identification tag on a client destination device.

As used herein, the term "identification tag" refers to any image, text, string of characters, graphical object, or other identifier that can be visually depicted. The identification tag may be a barcode, QR code, URL, or other textual/graphical coding scheme that represents/corresponds to media content that may be presented/observed/displayed/played on a client destination device.

As used herein, the term "media content" (or "content" as it will often be referred to hereinafter) refers to visual content (e.g., an image/photo, video, statute, structure, or other art work), audio content (e.g., sound clip, song, audio recording, etc.), haptic content (e.g., vibrational signals/patterns), a traversable real-world environment (e.g., a retail store, museum, sports stadium, theme park, national park, etc.), an augmented reality environment (e.g., a digital art gallery, a proposed retail store layout, etc.), and/or any other type of experience that can be captured, created, recorded, preserved, and/or otherwise represented by data/files and presented, experienced, demonstrated, played, displayed, etc. on an electronic device.

Figure 1A:
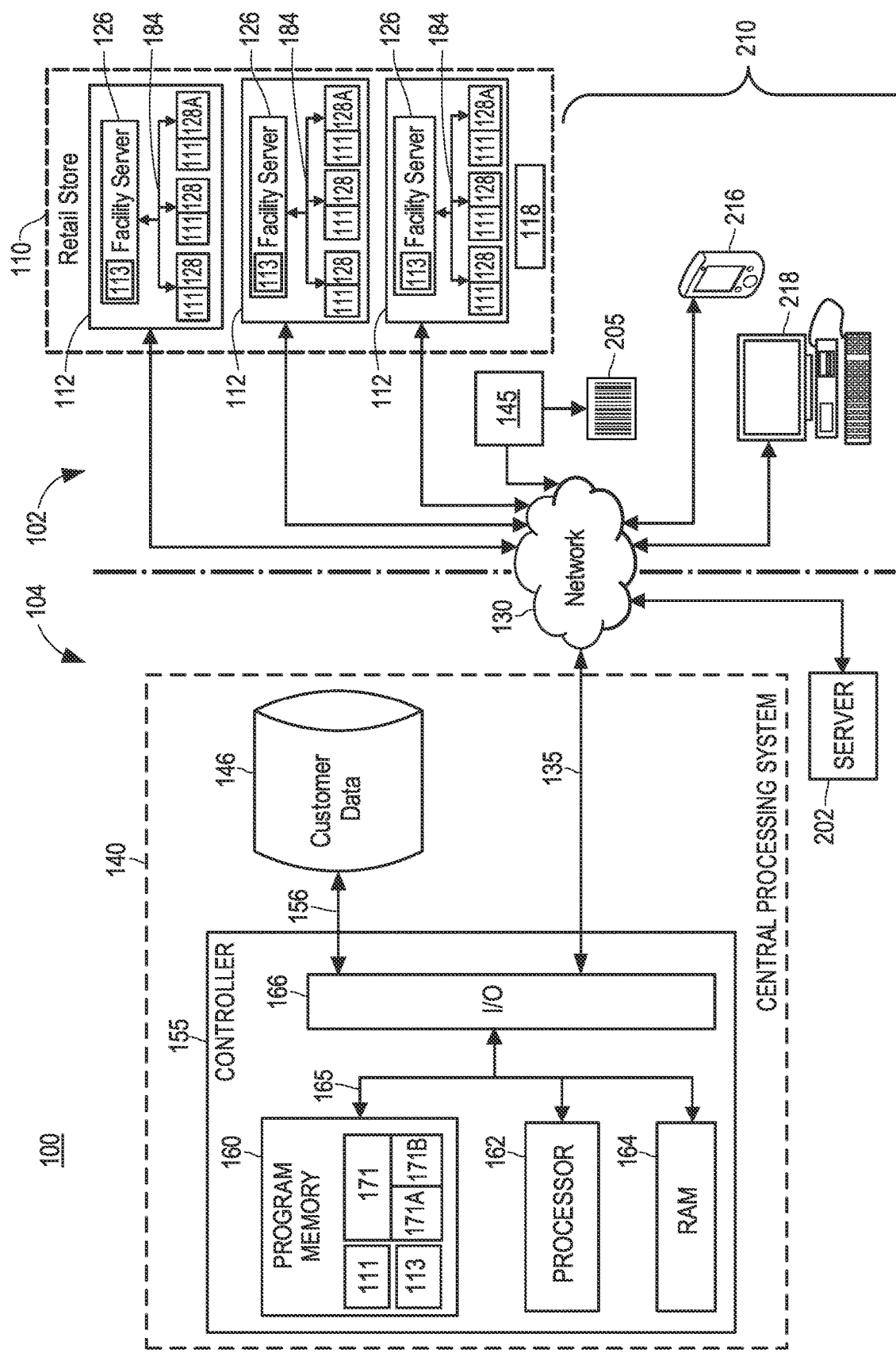
FIG. 1A illustrates a block diagram of a computer network and system on which content is stored in furtherance of generating an identification tag corresponding to the content.

FIG. 1A illustrates a block diagram of a computer network and system 100 on which content is stored in furtherance of generating an identification tag corresponding to the content. It should be appreciated that the system 100 is merely an example and that alternative or additional components are envisioned. The system 100 includes both hardware and software applications, as well as various data communication channels for communicating data between the various hardware and software components. The system 100 may be roughly divided into front-end components 102 and back-end components 104. The front-end components may include a host network 110 and a client network 210. The back-end components may include a central processing system 140 and one or more proprietary servers 202.

The front-end components 102 communicate with the back-end components 104 via a digital network 130. The digital network 130 may be a proprietary network, a secure public Internet, a virtual private network or some other type of network, such as dedicated access lines, plain ordinary telephone lines, satellite links, combinations of these, etc. In embodiments in which the digital network 130 comprises the Internet, data communication may take place over the digital network 130 via an Internet communication protocol.

The front-end components 102 may be disposed within a host network 110, including one or more retail stores 112, and/or or a client network 210, including any physical environment in which a user is physically present. In some embodiments, the host network 110 and the client network 210 may be a single network.

The client network 210 may include one or more client source devices 216, one or more client destination devices 218, and an identification tag 205. The client source device 216 may include, by way of example, any electronic device, such as a smart phone, a desktop computer, a laptop, a tablet, a phablet, a smart watch, smart glasses, wearable electronics, pager, personal digital assistant, a home assistant and/or digital concierge device, and/or any other electronic device, including computing devices configured for wireless radio frequency (RF) communication to capture and/or upload/transmit/transfer content to the proprietary server 202. The client source device 216 may be communicatively connected to the client destination device 218, the retail stores 112, and to a system 140 through the digital network 130, as described below. Components and features of the client source device 216 will be discussed in greater detail with respect to FIG. 1D. The client destination device 218 may include, by way of example, any electronic device, such as a smart phone, a desktop computer, a laptop, a tablet, a phablet, a smart watch, smart glasses, wearable electronics, pager, personal digital assistant, a home assistant and/or digital concierge device, virtual reality headset, virtual reality simulator, and/or any other electronic device, including computing devices configured for wireless radio frequency (RF) communication to receive and/or present content. The client destination device 218 may be communicatively connected to the client source device 216, the retail stores 112, and to a system 140 through the digital network 130, as described below. Components and features of the client destination device 218 will be discussed in greater detail with respect to FIG. 1E. It should be appreciated that in some embodiments, the client source device 216 and the client destination device 218 may be the same device or a single device configured to operate and perform the functionalities as the client source device 216 and/or client destination device 218. It should be appreciate that a device may operate and perform the functionalities as a client source device 216 despite also being configured to operate as a client destination device 218, and vice-versa. For example, a user may capture and upload images using a smart phone device, and then later use that same smart phone device to scan an identification tag 205 and access the same uploaded content originally captured on the smart phone device and/or other uploaded content.

The retail stores 112 may be located, by way of example rather than limitation, in separate geographic locations from each other, including different areas of the same city, different cities, or even different states. Each of the retail stores 112 may be, for example, an in-store retail store, an on-line store, or a mail-order store. An in-store retail store may be a "brick and mortar" store that may include one or more physical buildings or structures, where each of the retail stores 112 may accommodate shoppers and customers. The host network 110 may also include one or more warehouses or central-printing facilities 118. The warehouses or central-printing facilities 118 may distribute physical prints of an identification tag to the various retail stores 112 in the host network 110, or may distribute the physical prints of an identification tag directly to customers. As used herein, the term "retail store" refers to any of these environments (e.g., kiosks, Internet interface terminals, etc.).

The one or more retail stores 112 may include a number of workstations 128 configured to execute various product and service-related applications. The workstations 128 may be local computers located in the various retail stores 112 throughout the host network 110. The workstations 128 may include a user interface application 111, a server application 113, a facility server 126, and a printer 145. Retail store personnel (not shown) may use the workstations 128 to access information relating to customers, store inventory, available products, payments, identification tags, and so forth. The server application 113 may be communicatively connected with the client source device 216 and the client destination device 218 via the network 130. The server application 113 may be configured to receive data/files, corresponding to uploaded content and/or an identification tag, transmitted from the client source device 216, via the network 130, and then route the received data/files to other devices (e.g., a printer 145, client destination device 218, etc.).

The printer 145 may be any device that is capable of printing, creating, or otherwise generating a physical depiction of an identification tag 205, based upon received data/files corresponding to the identification tag. The server application 113 and/or client source device 216 may be communicatively connected with the printer 145. The printer 145 may be associated with a maximum resolution and/or a variety of supported print sizes. The printer 145 may print 2D or 3D depictions (e.g., images, text, a barcode, QR code, URL, an icon, a logo, etc.) on any tangible medium. In some embodiments, the printer 145 may be a 3D printer that prints the identification tag as one or more 3D articles (e.g., cutouts, sculptures, shapes, etc.) depicting the identification tag. The printer 145 may print the identification tag 205 on paper having adhesive qualities (e.g., "pull n' peel", sticker sheet, etc.) so that the identification tag may be easily and securely affixed to and/or removed from any number of surfaces and/or articles. Although FIG. 1A depicts only one printer 145, it should be appreciated that the server application 113 may be interconnected to any number of printers configured to print a physical embodiment of the identification tag. Moreover, environments other than the retail stores 112 may employ a server application and a printer so that a user can print physical depictions of the identification tag from a personal, public, or other printer (e.g., within the client network 210) at the user's own convenience. Accordingly, in some embodiments the printer 145 may be part of the host network 110, whereas in other embodiments the printer 145 may be part of the client network 210. For example, a user may be able to print an identification tag from the user's own personal printer located in the user's home, office, or other personal dwelling.

The identification tag 205 may be a physical depiction of the identification tag. The identification tag 205 may be printed, created, or otherwise generated by the printer 145. The identification tag 205 may be scanned by the client destination device 218, or a component of the client destination device 218, in furtherance of accessing content stored on the proprietary server 202/central processing system 140. In some embodiments, the identification tag 205 may be a two-dimensional print (e.g., a piece of paper, a poster, a sticker, a pamphlet, a price tag, etc.). In some embodiments, the identification tag 205 may be a three-dimensional article (e.g., cutouts, sculptures, shapes, etc.). The identification tag 205 may have adhesive properties on one or more of its surfaces such that it is configured to be easily affixed and/or removed from any number of surfaces and/or articles.

The retail stores 112 may also include a plurality of facility servers 126 disposed instead of, or in addition to, a plurality of workstations 128. Each of the retail stores 112 may include one or more facility servers 126 that may facilitate communications between the workstations 128 of the retail stores 112 via the digital network 130, and may store information for a plurality of customers/employees/accounts/etc. associated with each facility. A local digital network 184 may also operatively connect each of the workstations 128 to the facility server 126. Unless otherwise indicated, any discussion of the workstations 128 also refers to the facility servers 126, and vice versa. Moreover, environments other than the retail stores 112 may employ the workstations 128 and the servers 126.

One or more of the front-end components 102 may be excluded from communication with the back-end components 104 by configuration or by limiting access due to security concerns. For example, the client source device 216 may be excluded from direct access to the back-end components 104. In some embodiments, the retail stores 112 may communicate with the back-end components via the digital network 130. In other embodiments, the retail stores 112, the client source device 216, and the client destination device 218 may communicate with the back-end components 104 via the same digital network 130, but digital access rights, IP masking, and other network configurations may deny access to the client source device 216 or client destination device 218.

The back-end components 104 may include a central processing system 140 and one or more proprietary servers 202. The retail stores 112 may be communicatively connected to different back-end components 104 having one or more functions or capabilities that are similar to the central processing system 140. The central processing system 140 may include a database 146 and a controller 155. The controller 155 may be operatively connected to the database 146 via a link 156 connected to an input/output (I/O) circuit 166. It should be noted that, while not shown, additional databases may be linked to the controller 155 in a known manner. The central processing system 140 may implement a server application 113 for providing data to a user interface application 111 operating on the workstations 128. The central processing system 140 may include one or more computer processors 162 adapted and configured to execute various software applications and components of the system 100, in addition to other software applications. The database 146 is adapted to store data related to the operation of the system 100 (e.g., uploaded content, identification tags, customer profile data, past identification tag purchases, an augmented digital reality environment housing the uploaded content, etc.) The central processing system 140 may access data stored in the database 146 when executing various functions and tasks associated with the operation of the system 100. Data stored in the database 146 may be delivered to the client source device 216, the client destination device 218, the server application 113, facility server 126, workstation 128, etc. For example, the database 146 may store content uploaded by a user, via the client source device 216, that may eventually be presented via the client destination device 218, as well as a register of the identification tags corresponding to the content uploaded by the user.

It should be appreciated that the systems and methods described herein and/or any embodiments thereof may comprise different quantities and/or types of the components described. For example, although FIG. 1A depicts the system 100 as including one central processing system 140 in communication with three retail stores 112, one client source device 216, one client destination device 218, one identification tag 205, etc., it should be understood that different numbers of processing systems, retail stores, identification tags, and devices may be utilized. For example, the digital network 130 (or other digital networks, not shown) may interconnect the central processing system 140 to a plurality of included central processing systems 140, hundreds of retail stores 112, and thousands of client source devices 216 and client destination devices 218. Similarly, in some embodiments, multiple components may be just a single component. For example, the client source device 216 and client destination device 218, although shown as two separate components in FIG. 1A, may be the same single device.

The controller 155 includes a program memory 160, the processor 162 (may be called a microcontroller or a microprocessor), a random-access memory (RAM) 164, and the input/output (I/O) circuit 166, all of which are interconnected via an address/data bus 165. A link 135 may operatively connect the controller 155 to the digital network 130 through the I/O circuit 166. Although FIG. 1A depicts only one controller 155 with one microprocessor 162, one program memory 160, and one RAM 164, it should be understood that different quantities of each may be utilized or present. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example.

The program memory 160 may contain machine-readable instructions (i.e., software) 171, for execution by the processor 162. The software 171 may perform the various tasks associated with operation of the retail store or retail stores, and may be a single module 171 or a plurality of modules 171A, 171B. While the software 171 is depicted in FIG. 1A as including two modules, 171A and 171B, the software 171 may include any number of modules accomplishing tasks related to retail store operation associated with the systems and methods described herein, including, for example, receiving uploaded content, receiving print orders for identification tags, managing inventory of identification tags, filling orders print orders, providing equipment for accessing uploaded content, and/or other services relating to supporting/operating a digital augmented reality.

Figure 1B:
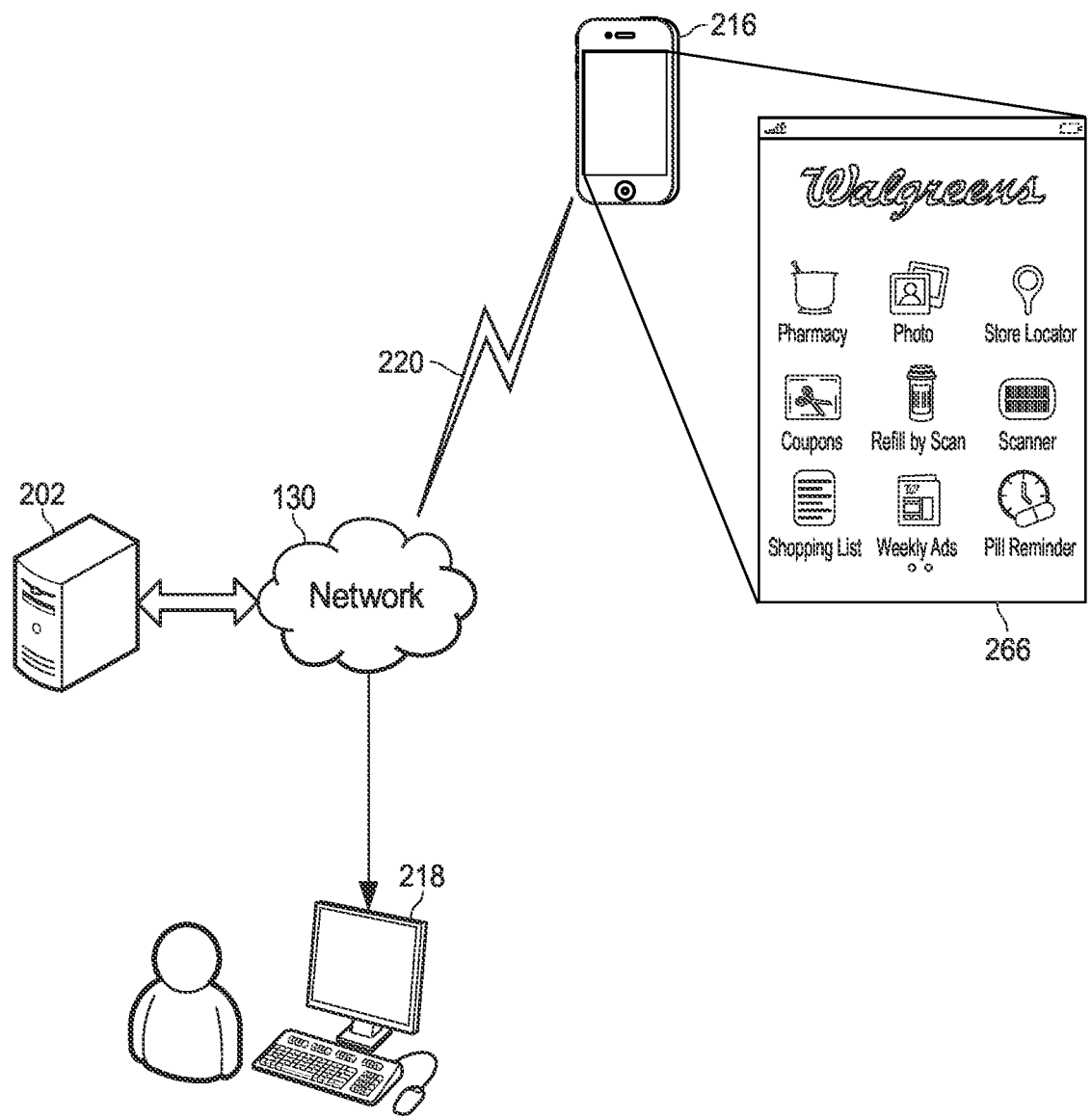
FIG. 1B illustrates a block diagram of an embodiment of the system in which a proprietary server and a client device are connected via a network.

FIG. 1B illustrates a block diagram of an embodiment of the system 100 in which a proprietary server 202, the client source device 216, and the client destination device 218 are connected via the network 130. In some embodiments, implementing the system 100, the user may initiate and interact with the proprietary server 202 and the retail store systems (e.g., the central processing system 140) via a client source device 216, a client destination device 218, a specialized application such as the client application 266, or a plurality of web pages. In some instances, the client source device 216 and client destination device 218 may communicate with the network 130 via wireless signals 220 and, in some instances, may communicate with the network 130 via an intervening wireless or wired device (not shown), such as a wireless router, wireless repeater, base transceiver station of a mobile telephony provider, etc. The client source device 216 and/or client destination device 218 may interact with the proprietary server 202 to receive web pages or server data from the proprietary server 202 and may display the web pages or server data via a client application 266. It should be appreciated that in some embodiments, the client source device 216 and the client destination device 218 may be a single device or the same device. It should be appreciated that although only one proprietary server 202 is depicted in FIG. 1B, multiple proprietary servers 202 may be provided for the purpose of distributing server load, serving different web pages, implementing different portions of the retail store web interface, etc. These multiple proprietary servers 202 may include a web server, an entity-specific server (e.g., an Apple® server, etc.), a server that is disposed in a retail or proprietary network, an independent third-party server that is not under the control of the entity, etc.

Figure 1C:
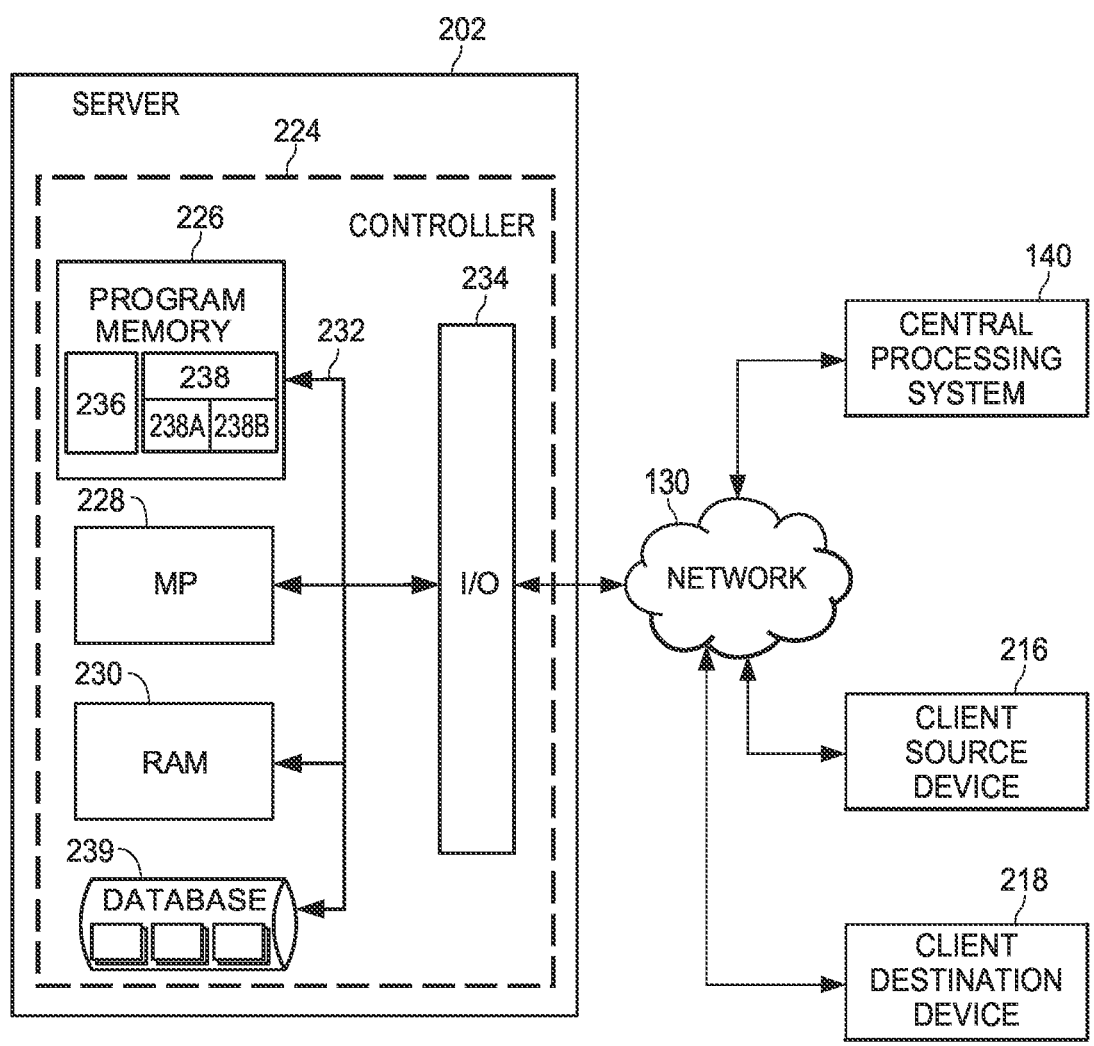
FIG. 1C illustrates a block diagram of an embodiment of the proprietary server.

FIG. 1C illustrates an embodiment of the proprietary server 202. The proprietary server may be connected to the central processing server 140, the facility server 126, the client source device 216, and/or the client destination device 218 via the network 130. The proprietary server 202 includes a controller 224. The controller 224 includes a program memory 226, a microcontroller or a microprocessor (MP) 228, a random-access memory (RAM) 230, and an input/output (I/O) circuit 234, all of which are interconnected via an address/data bus 232. The controller 224 may implement the RAM(s) 230 and the program memories 226 as semiconductor memories, magnetically readable memories, and/or optically readable memories, for example. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data necessary to interact with the user through the network 130.

In some embodiments, the proprietary server 202 may act as a routing or interfacing server between the client source device 216, the client destination device 218, and the central processing system 140 in order to assist in facilitating some of the functionality of the system 100. For example, the proprietary server 202 may be configured to communicate with the central processing system 140, the client source device 216, an/or the client destination device 216 via a multitude of protocols, such as packet-switched protocols, web services, web APIs (Application Programming Interface), etc. The proprietary server 202 may also convert (if necessary) and route client application data (not shown) to the appropriate server, such as the central process system 140. In some embodiments, the proprietary server 202 may act as the destination server and need not route any data from the client source device 216 and/or to the client destination device 218. It should be appreciated that references made throughout this disclosure to transmitting/receiving content/data/files/etc. to and/or from the proprietary server 202 may also entail transmitting/receiving content/data/files/etc. to and/or from the central processing system 140, either directly or indirectly.

The program memory 226 and/or the RAM 230 may store various applications for execution by the microprocessor 228. For example, a user-interface application 236 may provide a user interface to the proprietary server 202, which may, for example, allow a network administrator to configure, troubleshoot, or test various aspects of the server's operation, or otherwise to access information thereon. A server application 238 operates to populate and transmit client application data and web pages to the client source device 216 and client destination device 218, receive information from the client source device 216 and/or client destination device 218 transmitted back to the proprietary server 202, and forward appropriate data to the central processing system 140, client destination device 218, and the facility servers 126. The server application 238 may be a single module 238 or a plurality of modules 238A, 238B. While the server application 238 is depicted in FIG. 1C as including two modules, 238A and 238B, the server application 238 may include any number of modules accomplishing tasks related to implantation of the proprietary server 202. By way of example, the module 238A may populate and transmit the client application data and/or may receive and evaluate inputs from the user to receive a data access request, while the module 238B may communicate with one or more of the back end components 104 to fulfill a data access request. Although FIG. 1C depicts only one controller with one microprocessor 228, one program memory 228, and one RAM 230, it should be understood that different quantities of each may be utilized or present. Similarly FIG. 1C depicts the I/O circuit 234 as a single block, the I/O circuit 234 may include a number of different types of I/O circuits.

Figure 1D:
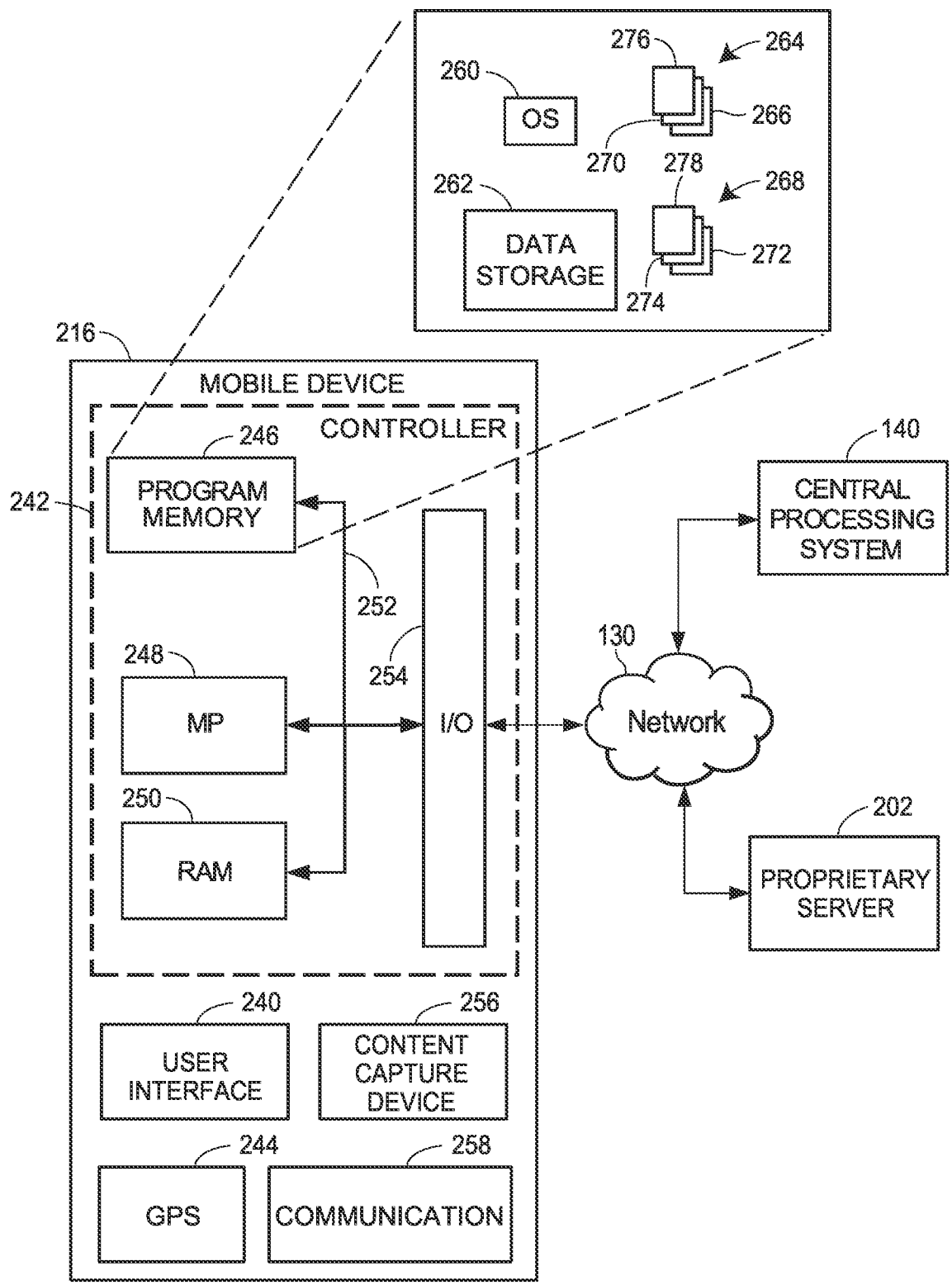
FIG. 1D illustrates a block diagram of a client source device.

FIG. 1D illustrates a block diagram of an embodiment of the client source device 216. The client source device 216, or a plurality of client source devices, may be configured to capture content, select content to upload, upload content to the proprietary server 202 and/or the central processing system 140, and generate a print of a physical depiction of the identification tag corresponding to the uploaded content. The client source device 216 may be connected to the central processing server 140, proprietary server 202, client destination device 218, and/or other components of the host network 110 via the network 130. The client source device 216 may include a user interface 240, a controller 242, a Global Positioning System (GPS) unit 244, a content capture unit 256, and a communication unit 258.

The user interface 240 may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In some embodiments, the user interface 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 240 may include one or more user-input devices (not shown). In some embodiments, the user-input device may include a "soft" keyboard that is displayed on a display/screen of the client source device 216, an external hardware keyboard communicating via a wired or a wireless connection (e.g., a Bluetooth keyboard), an external mouse, or any other suitable user-input device. In some embodiments, the user input device may be one or more auxiliary input ports such as a USB, lightning port, audio out, video out, etc. The user interface 240 may also include one or more user output devices (not shown) configured to connect the client source device 216 to additional components and/or to facilitate delivery of content to other devices. For example, the user output device may be one or more auxiliary output ports such as a USB, lightning port, audio out, video out, etc. The user output device may be configured to connect to a speaker, projector, earphones, vibrating device, smell generating/emitting device, headset, television, computer, phone, virtual reality hardware, monitor, or other electronic device. It should be appreciated that in some embodiments, the user input device and user output device may be a single I/O component.

The controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as media content, user profiles, application data for the plurality of applications 264, routine data for the plurality of routines 268, and other data necessary to interact with the proprietary server 202, the central processing system 140, the facility servers 126, and/or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that reside within the client source device 216. Although FIG. 1D depicts only one controller 242 with one microprocessor 248, one program memory 246, and one RAM 250, it should be understood that different quantities of each may be utilized or present. Similarly FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The GPS unit 244 may use "Assisted GPS" (A-GPS), satellite GPS, or any other suitable global positioning protocol or system that locates the position of the client source device 216. For example, A-GPS utilizes terrestrial cell phone towers or Wi-Fi hotspots (e.g., wireless router points) to more accurately and more quickly determine location of the client source device 216.

The communication unit 258 may communicate with the proprietary server 202 via any suitable wireless communication protocol network (e.g., GSM, CDMA, TDMA, WCDMA, LTE, EDGE, OFDM, GPRS, EV-DO, UWB, IEEE 802 including Ethernet, WiMAX, Wi-Fi, Bluetooth, and others). In some embodiments, the communication unit 258 is a transceiver.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the client source device 216. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the proprietary server 202, the facility servers 126, or the server applications 113 while also receiving inputs from the user.

In some embodiments, the one or more of the plurality of software routines 268 may include a content capture routine 272, a location awareness routine 276, a content upload routine 274, and an identification tag generation routine 278. The content capture routine 272 may be implemented as a series of machine-readable instructions for using the content capture device 256 to capture/record content, or otherwise retrieve data corresponding to captured content. The location awareness routine 276 may be implemented as a series of machine-readable instructions for receiving, interpreting, and displaying location information of the client source device 216 from the GPS unit 244. The content upload routine 274 may be implemented as a series of machine-readable instructions for uploading/transmitting/transferring the captured content and/or content stored locally on the client source device 216, from the client source device 216 to the proprietary server 202. In some embodiments, the content upload routine 274 may edit/modify the captured content so that it is in a compatible format or file type to be uploaded/stored on the proprietary server 202. In some embodiments, the content upload routine 274 may edit/modify the captured content to improve the quality of the content. For example, the content upload routine 274 may improve the image quality of a captured image by eliminating noise, removing red eyes of any individuals in the image, brightening the lighting exposure, or otherwise improving the quality of the captured content. The identification tag generation routine 278 may be implemented as a series of machine-readable instructions for creating a unique identification tag corresponding to the uploaded content, or the location of the uploaded content on the proprietary server 202, central processing system 140, or component thereof.

In some embodiments, the client source device 216 may further include a media capture device 256 configured to capture, record, collect, or otherwise create content to be uploaded. The content capture device 256 may be any device configured to capture an image, video, audio recording, haptic patterns, and/or other type of media content. In some embodiments, the content capture device 256 is configured to capture multimedia, such as a recording with video and audio or three-dimensional traversable augmented reality environment. The client capture device 256 may be built into, or a component of, the client source device 216. In some embodiments, the content capture device 256 may be an external camera, such as a webcam, that is communicatively coupled with the client source device 216. Examples of the content capture 256 device include, but are not limited to, a camera, webcam, microphone, and video recorder. The client source device 216 may store one or more image, video, audio, haptic, traversable augmented reality environments, and/or other files in a memory therein. For example, the client source device 216 may include a database of files 239 within the memory. In some embodiments, the database 239 may be additionally or alternatively stored at a server (e.g., facility server 126, etc.) and/or another third party server (such as one associated with DropBox, Amazon, Google Drive, iCloud, etc.). In some embodiments the database 146 may store the same data as the database 239. Although FIG. 1D depicts the database 239 as coupled to the client source device 216, it is envisioned that the database 239 may be maintained in the "cloud" such that any element of the environment 100 capable of communicating over the network 130 may directly interact with the database 239.

Figure 1E:
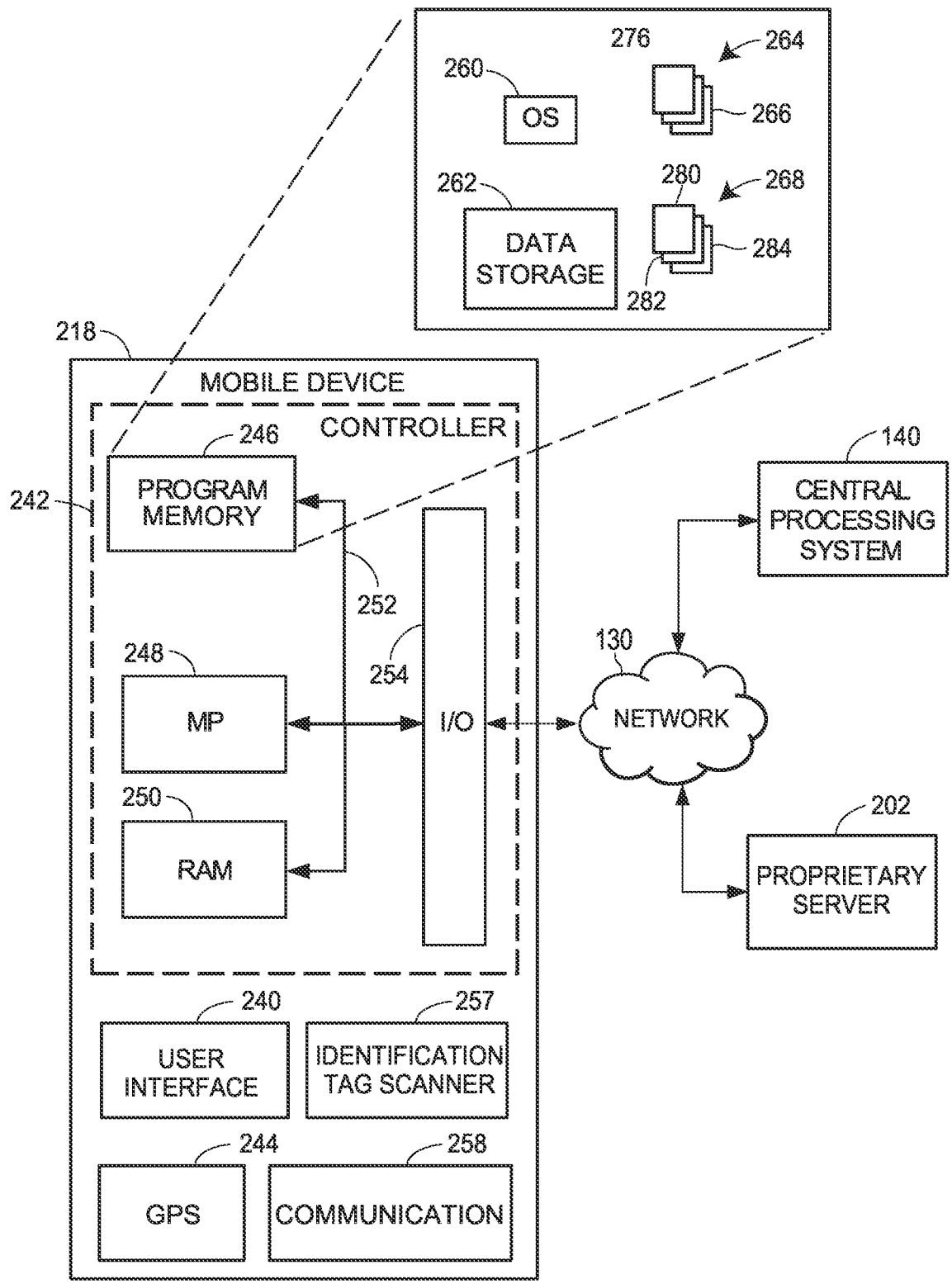
FIG. 1E illustrates a block diagram of a client destination device.

FIG. 1E illustrates a block diagram of an embodiment of a client destination device 218. FIG. 1D illustrates a block diagram of an embodiment of the client source device 216. The client destination device 218, or a plurality of client destination devices, may be configured to, scan an identification tag to retrieve uploaded content from the proprietary server 202 and/or the central processing system 140, and present the content to a user. The client destination device 218 may be connected to the central processing server 140, proprietary server 202, the client source device 216, and/or other components of the host network 110 via the network 130. The client destination device 218 may include a user interface 240, a controller 242, a Global Positioning System (GPS) unit 244, an identification tag scanner 257, and communication unit 258. The user interface 240, the controller 242, the Global Positioning System (GPS) unit 244, and the communication unit 258 of the client destination device 218 may operate in the same, or a similar manner, as described above with respect to the client source device 216.

In some embodiments, the one or more of the plurality of software routines 268 a location awareness routine 276, an identification tag scanning routine 280, an identification tag recognition routine 282, and a content presentation routine 284. The identification tag scanning routine 280 may be implemented as a series of machine-readable instructions for coordinating the identification tag scanner 257 to obtain image/video data of the physical depiction of the identification tag. The identification tag recognition routine 282 may be implemented as a series of machine-readable instructions for determining what content, stored on the proprietary server 202, corresponds to the scanned identification tag. The content presentation routine 284 may be implemented as a series of machine-readable instructions for coordinating, formatting, and presenting the content, corresponding to the scanned identification tag, via the client destination device 218. In some embodiments, the content presentation routine 284 may format the content for a specific user and/or for a specific client destination device.

In some embodiments, the client destination device 218 may further include the identification tag scanner 257 configured to record/collect/create/capture an image, video, or other data corresponding to the identification tag depicted on the physical print of the identification tag. The identification tag scanner 257 may be any device configured to capture an image, video, and/or other type of data corresponding to the physical depiction of the identification tag. The identification tag scanner 257 may be built into, or a component of, the client destination device 218. In some embodiments, the identification tag scanner 257 may be an external camera, such as a webcam, that is communicatively coupled with the client destination device 218. Examples of the content capture device include, but are not limited to, a camera, webcam, video recorder, fax machine, photocopy machine, digital scanner, barcode scanner, and QR code scanner. It should be appreciated that in some embodiments, the content capture device 256 of the client source device 216, or a component of the content capture device 256, and the identification tag scanner 257 may be the same device and operate in the same or a similar manner. For example, in an embodiment in which the client source device 216 and the client destination device 218 are the same device, such as a smart phone with a camera, the content capture device 256 and the identification tag scanner 257 may be the same camera.

It should be appreciated that in some embodiments, the client source device 216 and the client destination device 218 may be the same device, or two separate devices that contain the same, or similar, hardware and software components, and thus operate in the same, or a similar, manner.

Generally, the term "user" is used when referring to a person who is operating one of the client source device 216 or client destination device 218 and is not exclusive of the term "customer." Further, it should be appreciated that the term user may refer to two or more individuals. For example, a user operating the client source device 216 may be a different individual than the user operation the client destination device 218.

In operation, a user may use the client source device 216 to launch the client application 266 to access the proprietary server 202 cooperating with the central processing system 140 and the retail host network 110. To upload content from the client source device 216 to the proprietary server 202, the user may capture original content using the content capture device 256 or may select from existing content stored locally on the client source device 216, and then the client application 266 executes a content upload routine 274. The proprietary server 202 may store the uploaded content in database the 146 of the central processing system 140, and then execute the identification tag generation routine 278 to generate an identification tag corresponding to the content stored in database 146. After the proprietary server has stored the content and generated the identification tag corresponding to the content, the user may use the client application 266 to create one or more physical depictions of the identification tag 205 and print the one or more physical depictions of the identification tag 205 using the printer 145. After the one or more physical depictions of the identification tag 205 have been printed, the content stored in the database 146 may be accessed by using the client application 266. To access the content corresponding to an identification tag, a user may use the client destination device 218 to launch the client application 266. The client application 266 may execute the identification tag scanning routine 280 to activate the identification tag scanner 257 to scan the physical depiction of the identification tag 205. After the identification tag scanner 257 scans the physical depiction of the identification tag 205, the proprietary server 202 may execute an identification tag recognition routine 282 to identify and locate the content stored in the database 146. Once the proprietary server 202 identifies and locates the content corresponding to the scanned identification tag, the proprietary server 202 may execute the content presentation routine 284 to configure, format, and present the content on the client destination device 218.

As shown in FIG. 1B, to access the proprietary server 202, the facility servers 126, or the server applications 113, the user executes the client application 266 on the client source device 216 and/or client destination device 218. Using the client application 266, the user may request server data (not shown) by navigating a series of client application screens, such as the home screen 222 of the client application 266. FIGS. 2-17 depict client application pages or screens that the proprietary server 202, the facility servers 126, or the server applications 113 may transmit in various embodiments of the system 100. In any event, the user may launch the client application 266 from the client source device 216 or client destination device 218 via any suitable manner, such as touch-selecting a client application icon (not shown) on the display 240 of the client source device 216/client destination device 218, double-clicking on the client application icon via a mouse of a computer or a trackpad of a laptop. After the user launches the client application 266, the home screen 222 of the client application 266 is displayed to the user on the client source device 216/client destination device 218.

In an embodiment, a client device may store machine-readable code, stored in a memory therein, representative of an identification tag application for capturing content, uploading content, generating an identification tag corresponding to the uploaded content, printing a physical depiction of the identification tag, scanning an identification tag to access content, determining stored content corresponding to the scanned identification tag, formatting content corresponding to a scanned identification tag to be presented on a client destination device, and/or presenting/delivering the formatted content to the client destination device. As part of this, the user may launch and/or execute the client application 266. In response, the client device may display one or more interfaces that may direct the user through the process of capturing content, uploading content, generating an identification tag corresponding to the uploaded content, printing a physical depiction of the identification tag, scanning an identification tag to access content, determining stored content corresponding to the scanned identification tag, retrieving the content from the proprietary server, formatting the content to be presented for a specific user and/or a specific client device, and/or presenting the formatted content to the client device. In some embodiments, the client device may include a browser application that enables the user to navigate to a website to perform a task and/or functionality associated with the identification tag application. Accordingly, the description herein of the functionality of an application, refers also to providing similar functionality via a web site, and vice versa.

Figure 2:
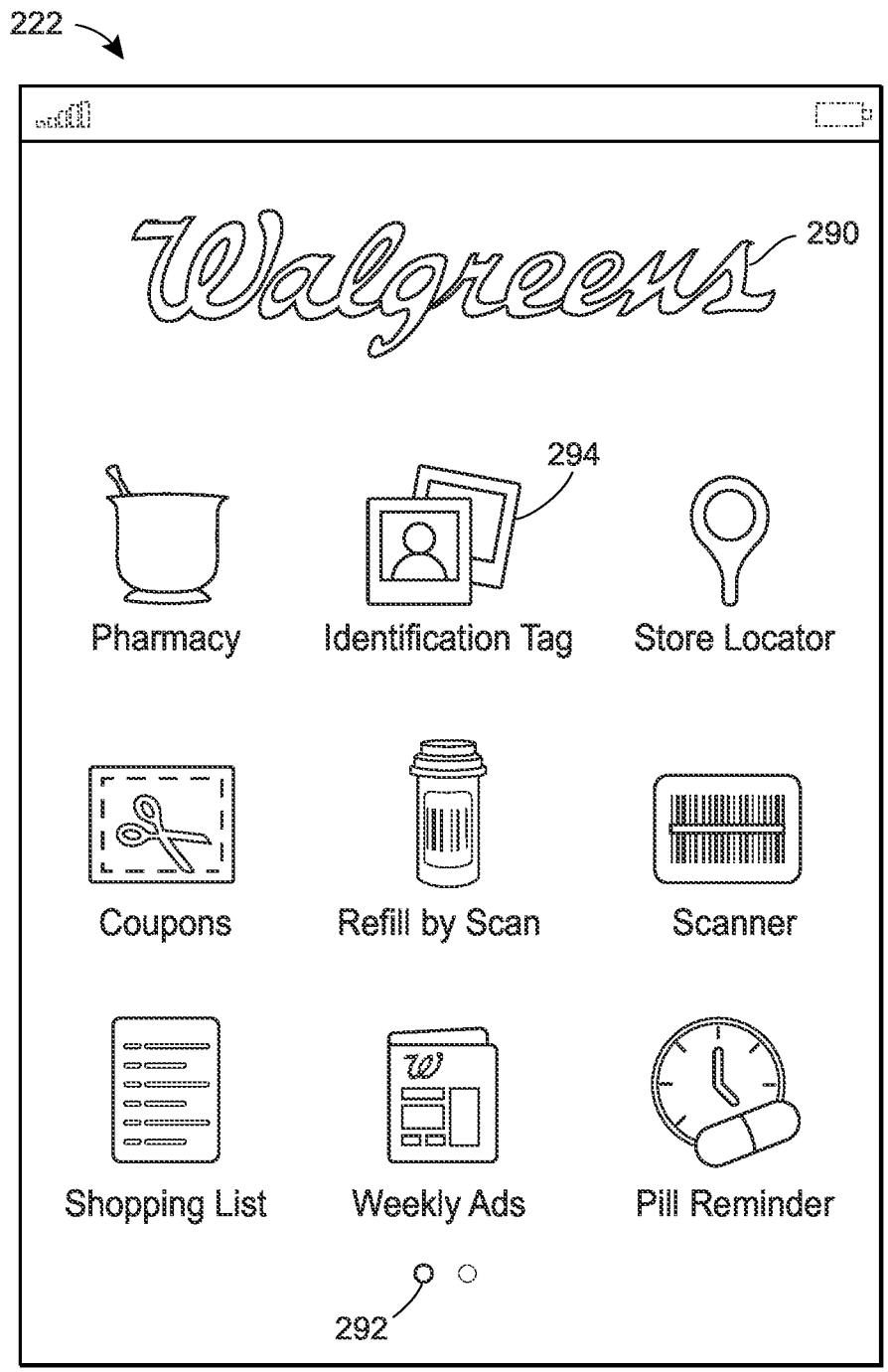
FIG. 2 illustrates a home screen of a client application.

FIG. 2 illustrates a home screen 222 of the client application 266. A first menu page of a home screen 222 of the client application 266, for example, is displayed to the user on a client device. The home screen 222 may include a company logo 290, a Digital Content Identification Tag services link 294, and a menu page indicator 292. In FIG. 2, the menu page indicator 292 denotes that only the first menu page of the home screen 222 is currently being displayed. The user may touch-swipe on the display 240 of the client device to view the second menu page (not shown) of the home screen 222. The second menu page of the home screen 222 may display additional links that cannot be accommodated on the first menu page of the home screen 222 (e.g., a user log-in link, a shopping link, etc.). In another embodiment, using the client application 266, the user may request and navigate a series of web pages, such as webpage 221 for instance, transmitted, preferably in a secure manner (e.g., using Hypertext Transfer Protocol Secure, known as "HTTPS"), by the proprietary server 202 to the client device. These web pages 221 may be interpreted and displayed via a web browser 270 of the client device. It should be understood that it may be desirable for some or all of the data transmitted from the proprietary server 202 to the client source device 216/client destination device 218, or vice versa, to be encrypted and/or otherwise transmitted in a secure manner.

Figure 3:
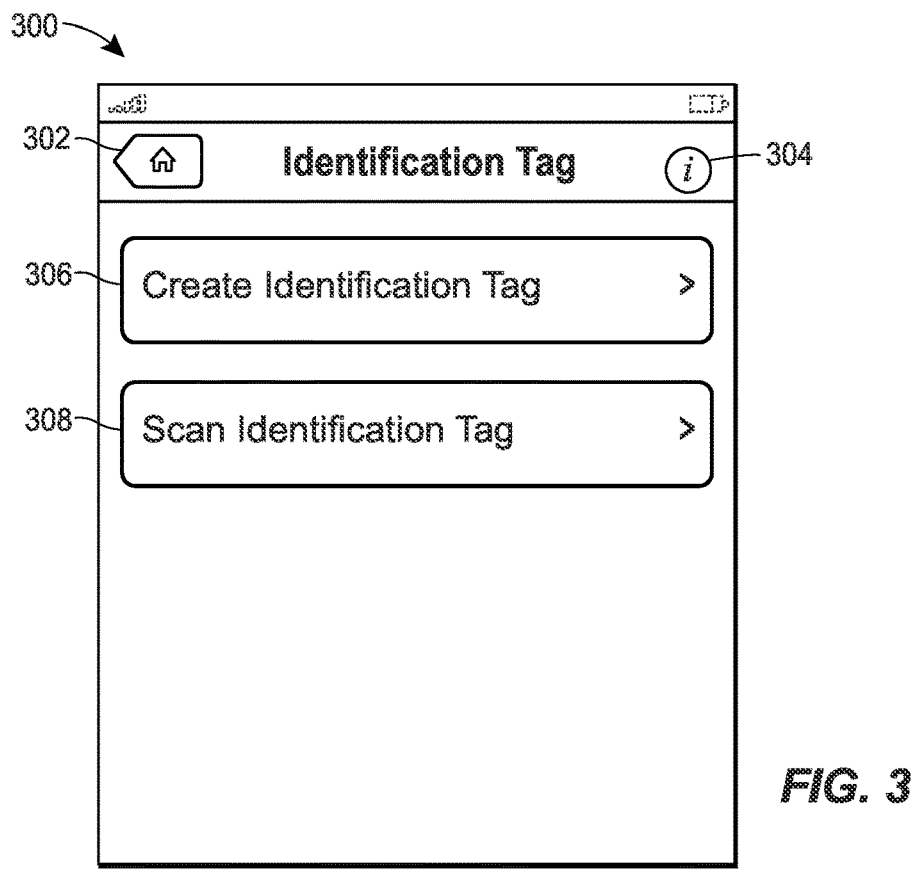
FIG. 3 illustrates an identification tag source screen of a client application.
Figure 4:
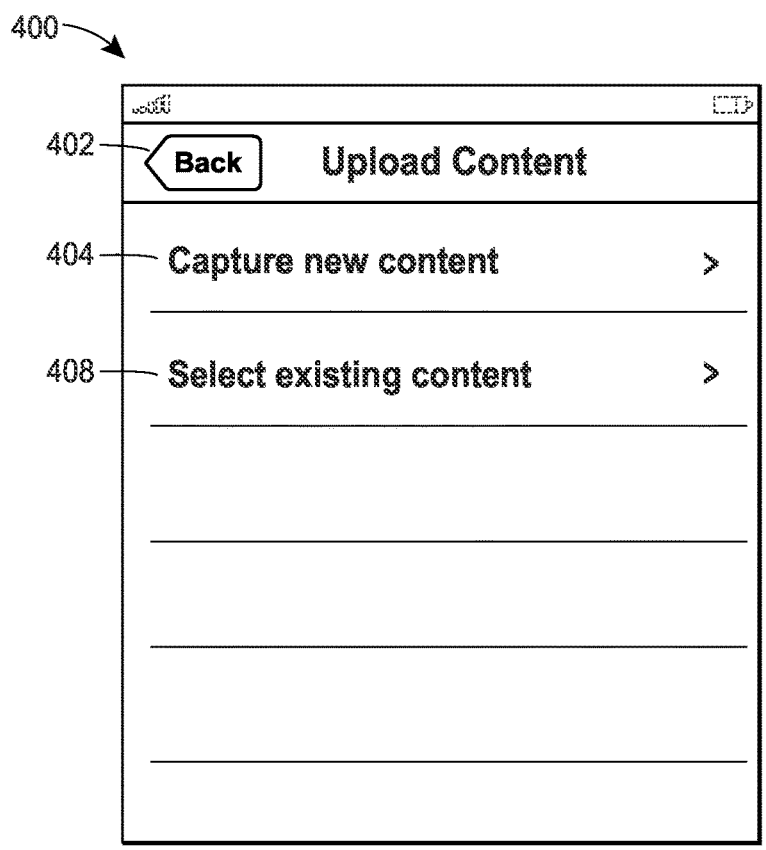
FIG. 4 illustrates a content upload source screen of a client application.
Figure 11:
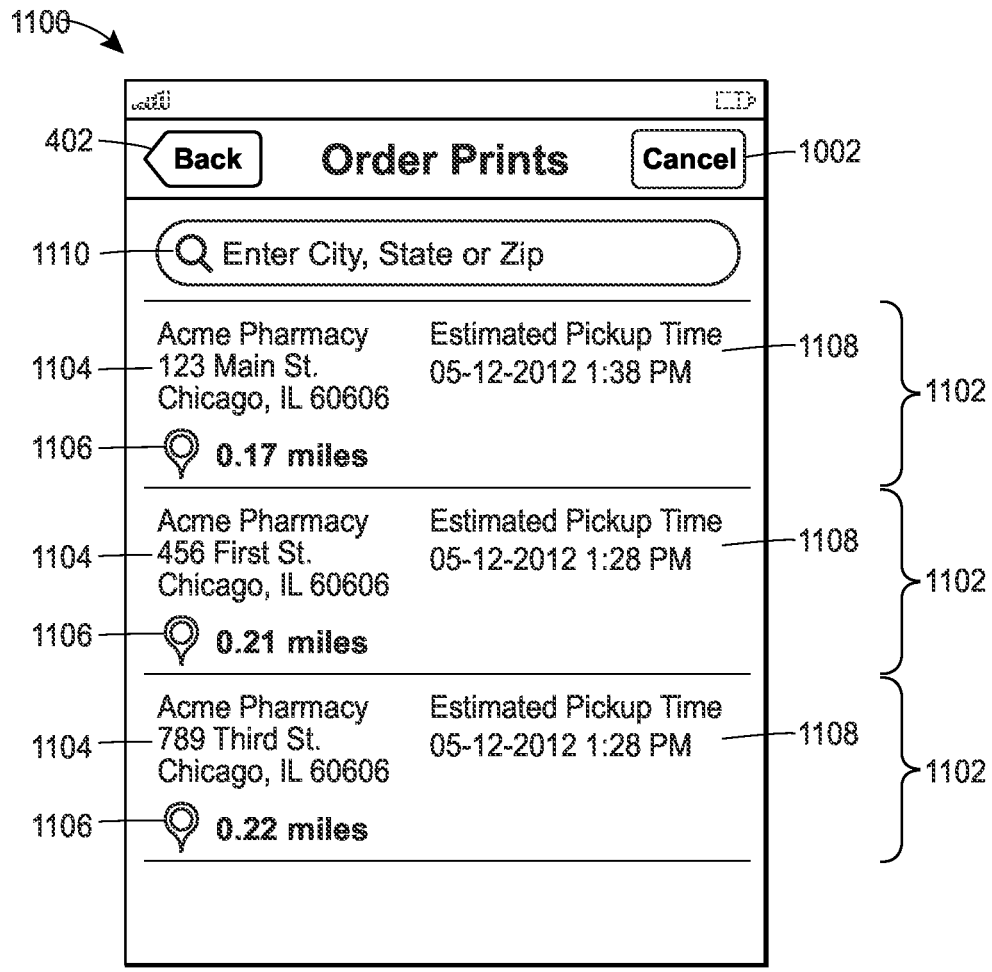
FIG. 11 illustrates a printer selection screen of a client application.

FIG. 3 illustrates an identification tag source screen 300 of the client application 266. From the home screen 222, a user may select the "Digital Content Identification Tag" link 294 to navigate directly to the identification tag source screen 300 (hereinafter "source screen") for selecting between creating a new identification tag and scanning an existing identification tag in order to access content, as shown in FIG. 3, that may be displayed on the client device via the client application 266. It should be appreciated that while the client application 266 is configured to operate all operations and functionality on the client source device 216, the client destination device 218, and/or any device comprising a combination of the two, operations and functionality pertaining to creating a new identification tag using the client application 266 may typically be performed on the client source device 216, whereas as operations and functionality pertaining to scanning an existing identification tag may typically be performed on the client destination device 218. The identification tag source screen 300 may include a home button 302 that causes the client application 266 to return to the home screen 222. An instructional message 303 may provide directions of use that assist the user in properly selecting between creating a new identification tag and scanning an existing identification tag to access content in an augmented reality environment. An information button 304 may cause the client application 266 to display instructions associated with the system 100, or cause the web browser 270 of the client device to navigate to a web page containing such instructions. The source screen 300 also may include an identification tag creator button 306 (typically selected by a user when operating the client source device 216), an identification tag scanner button 308 (typically chosen by a user when operating the client destination device 218), or any other suitable indication for the user to select between creating a new identification tag and scanning an existing identification tag to access content. For example, the identification tag creator button 306, when activated by the user, may cause the client application 266 to navigate directly to a content upload source screen 400 for selecting between capturing new content or retrieving existing content, as shown in FIG. 4, that may be displayed on the client source device 216 via the client application 266. Conversely, for example, the identification tag scanner button 308, when activated by the user, may cause the client application 266 to navigate directly to an identification tag scan screen 1100 for capturing an image of an existing identification tag, as shown in FIG. 11, that may be displayed on the client destination device 218 via the client application 266. In some embodiments, the client application 266 does not require the user to log onto the proprietary network 130 or the client application 266 to retrieve content to be uploaded in furtherance of creating a new identification. Alternatively, the user may be required to log into the proprietary network 130 for the client application 266 to retrieve, from a remote server, content associated with the user.

FIG. 4 illustrates a content upload source screen 400 of a client application 266. The content upload source screen 400 may provide a user interface on the client source device 216 for selecting between capturing new content or retrieving existing content in furtherance of uploading content to a proprietary server 202. The content upload source screen 400 may include a "Back" selector icon 402 that causes the client application 266 to return to the content source screen 300 or the home screen 222. The content upload source screen 400 may include a capture new content selector icon 404, a select existing content selector icon 406, or any other selector icons or buttons suitable indication for the user to select between capturing new content or selecting existing content to upload. For example, a user activating the capture new content selector icon 404 may cause the client application 266 to navigate to a capture content selection screen 500 for selecting between a type of content to capture and then initiate a content capture routine 272 to capture the content. Conversely, for example, a user activating the select existing content selector icon 406 may cause the client application 266 to navigate to a capture content selection screen 600 for selecting a type of previously captured/existing content to upload.

Figure 5:
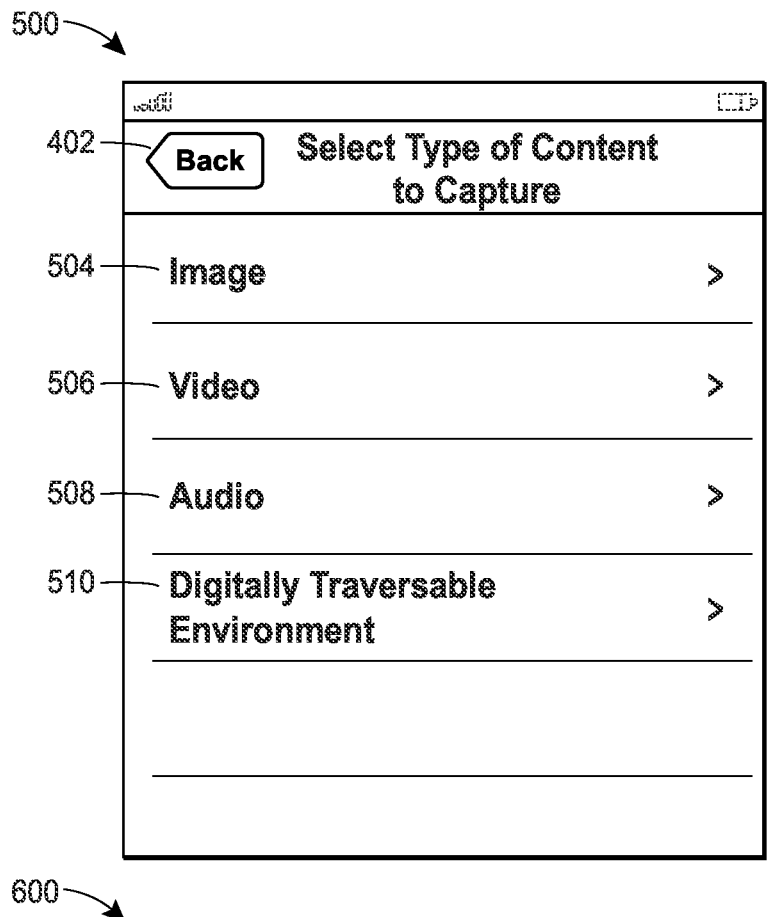
FIG. 5 illustrates a capture content selection screen of a client application.
Figure 8:
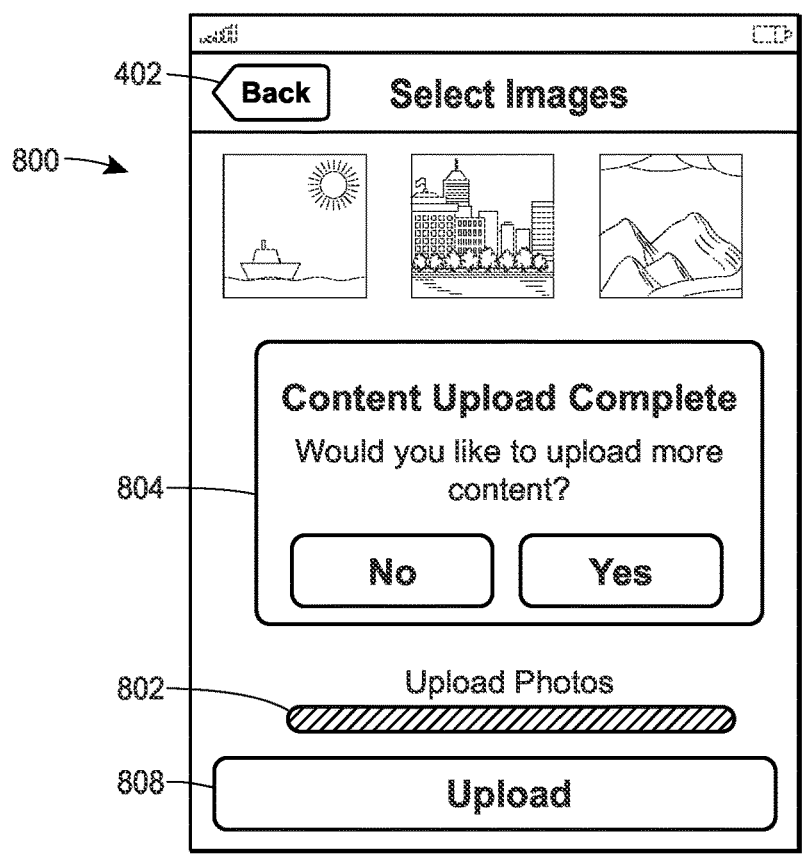
FIG. 8 illustrates a content upload screen of a client application.

FIG. 5 illustrates a capture content selection screen 500 of a client application 266. The capture content selection screen 500 may be configured to enable a user to select a type of content to capture. The capture content selection screen 500 may include a "Back" selector icon 402 that causes the client application 266 to return to the content source screen 300, the content upload source screen 400, or the home screen 222. The capture content selection screen 500 may also include content capture selector icons 504, 506, 508, 510 wherein each icon may indicate a respective type of content to capture, such as an image, video, or audio recording. In this embodiment, for example, selector icon 504 corresponds to capturing an image, selector icon 506 corresponds to capturing a video, selector icon 508 corresponds to capturing an audio recording, and selector icon 510 corresponds to creating a digitally traversable environment. Activating selector icon 504, for example, may cause the client application 266 to execute a content capture routine 272 that coordinates with the content capture device 256 to capture an image and provide the image data to the client application 266. In such an embodiment, the client application 266 displays the image data from the content capture routine 272 on a content capture screen (not shown). It should be appreciated that this process would operate in the same or a similar manner for embodiments in which a user activates selector icon 506, 508, or 510. In response to receiving the command to display the content capture screen, the client application 266 may provide a selection to recapture the content or use the currently captured content on the content capture screen. In response to receiving the command to recapture content (e.g., a blurry previously captured image, shaky video, video with a disruption, audio recording with excess noise, etc.), the client application 266 may again execute the content capture routine 272 that cooperates with the content capture device 256 to capture new/replacement content of the selected type of content. Alternatively, the selection to use the currently captured content (e.g., the quality and/or the subject matter of the currently captured content is acceptable to the user) may cause the client application 266 to navigate to a content upload screen 800, as shown in FIG. 8, that may be displayed on the client source device 216 via the client application 266.

Figure 6:
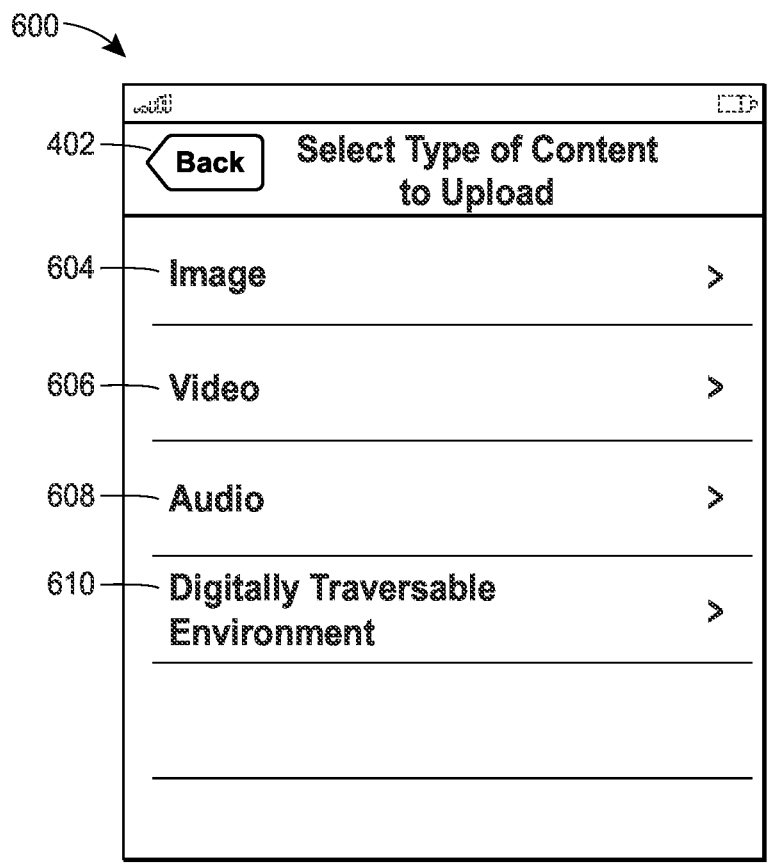
FIG. 6 illustrates a content selection screen of a client application.

FIG. 6 illustrates a content selection screen 600 of a client application 266. The content selection screen 600 may be configured to enable a user to select a type of content, which has already been captured, to upload to the proprietary server 202. The content selection screen 600 may include a "Back" selector icon 402 that causes the client application 266 to return to the content source screen 300, the content upload source screen 400, or the home screen 222. The content selection screen 600 may also include content selector icons 604, 606, 608, 610 wherein each icon may indicate a respective type of content, such as images, videos, audio recordings, digitally traversable environments, etc. If the user wishes to view the available content of a particular type of content, the user may select one of the content icons 604, 606, 608, 610 to view available content within a specific category of content. For example, upon receiving a selection for the "Images" selector icon 606, the client application 266 may navigate to the image selection screen 700, as shown in FIG. 7, to view individual images available to be uploaded.

Figure 7:
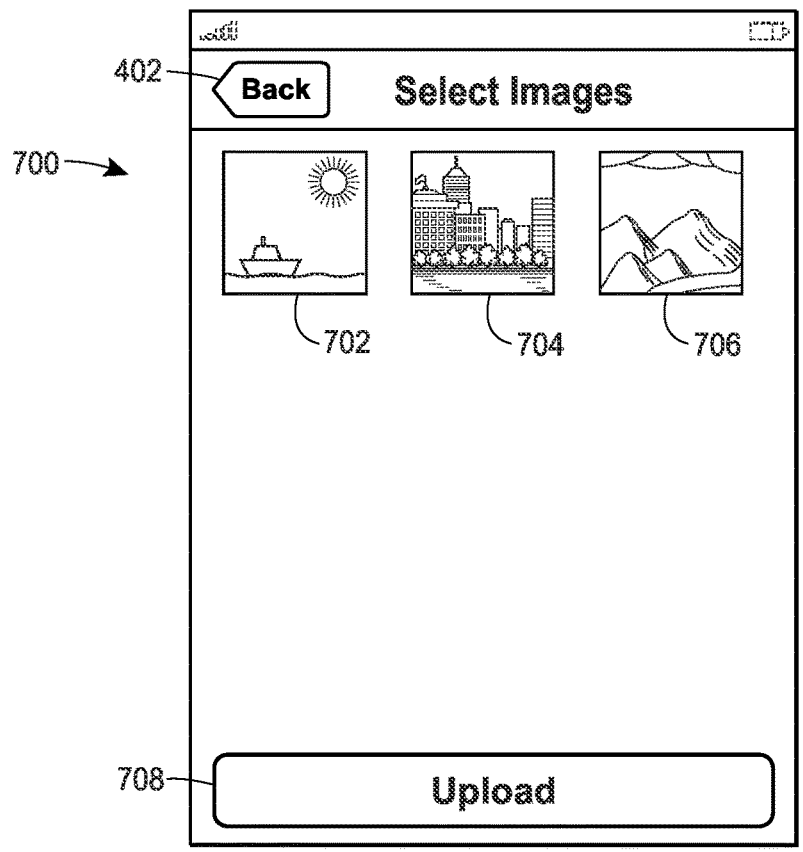
FIG. 7 illustrates an image selection screen of a client application.

FIG. 7 illustrates an image selection screen 700 of a client application 266. The image selection screen 700 may be configured to enable a user to select one or more images, from a plurality of images, to upload to the proprietary server 202. The image selection screen 700 may include the "Back" selector icon 402 that causes the client application 266 to return to the content selection screen 600, the content upload source screen 400, the content source screen 300, or the home screen 222. The image selection screen 700A may also include individual image selector icons 702, 704, 706 that allow the user to select individual images for upload and an "Upload" selector icon 708 to execute a content upload routine 274. Each image selector icons 702, 704, 706 may include a thumbnail image or a preview image that allows the user to preview a representation of the full image. The images may be cropped to uniformly display each image to the user in a homogenous manner, or any other suitable manner of displaying individual images within the album. Upon receiving a selection of the image selector icons 702, 704, 706, the client application 266 overlays an indication (not shown) that a particular image selector icon 702, 704, 706 has been selected. The client application 266 may allow for the selection of only one image selector icon 702, 704, 706 or for the selection of multiple image selector icons 702, 704, 706 at once. Upon receiving a selection of the "Upload" selector icon 708, the client application 266 may navigate to a content upload screen 800, as shown in FIG. 8, to transmits/upload/transfer the one or more images associated with the selected image selector icon(s) 702, 704, 706 to the proprietary server 202. It should be appreciated that the image selection screen 700 is merely a demonstrative example of one embodiment of a type of content selection.

The same or similar types of selection screens as the image selection screen 700 may be implemented and operate in the same or a similar type of manner for other types of content such as video, audio recording, digitally traversable environments, etc.

Figure 9:
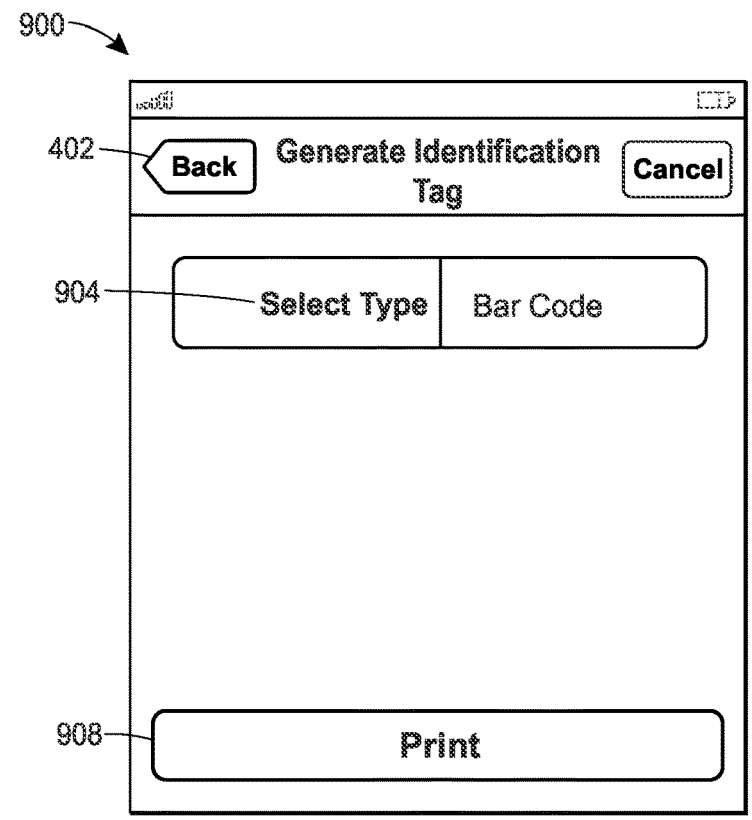
FIG. 9 illustrates an identification tag generation screen of a client application.

FIG. 8 illustrates a content upload screen 800 of a client application 266. The content upload screen 800 may be configured to modify, upload/transmit, and/or provide the status of uploading/transmitting the captured/selected content from the client source device 216 to the proprietary server 202. While the content upload screen 800 is displayed on the client source device 216, the client application may execute the content upload routine 274. The content upload screen 800 may display a status bar 802 that represents the progress of the content upload to the proprietary server 202 on the client source device 216 via the client application 266. If the user wishes to cancel the content transfer to the proprietary server 202, the "Back" selector icon 402 may be selected, and the client application 266 may interrupt the uploading process and display a "Cancel Upload" alert message. The "Cancel Upload" alert message (not shown) may request confirmation from the user to abort the content transfer to the proprietary server 202. In any event, if the "Back" selector icon 402 is not selected, the content upload may continue to display content transferring progress via the status bar 602 until successfully transferred to proprietary server 202. In response to receiving a confirmation that the content successfully uploaded to the proprietary server 202, the client application 266 may display an "Upload Complete" alert message 804 to the user that requests whether the user would like to upload more content. In receiving a positive response to the "Upload Complete" alert message 804, the client application 266 may redirect the user back to the content upload source screen 400, as shown in FIG. 4, to receive another selection of content to upload to the proprietary server 202. Moreover, the content upload source screen 400 may include an indication (not shown) that the previously captured/selected content has been uploaded. Once the content has been successfully uploaded/transmitted/transferred from the client source device 216 to the proprietary server 202, the client application 266 may navigate to an identification tag generation screen 900, as shown in FIG. 9. If the client application 266 receives a negative response to the "Upload Complete" alert message 804, i.e. "No", the client application 266 may redirect the user to an identification tag print order information screen 700, as shown in FIG. 7, that may be displayed on the client source device 216 via the client application 266.

FIG. 9 illustrates an identification tag generation screen 900 of a client application 266. The identification tag generation screen 900 is configured display, via the client source device 216, the identification tag corresponding to the uploaded content. Before and/or while the client source device 216 is displaying the identification tag generation screen 900, the client application 266 may execute the identification tag generation routine 278. The identification tag generation screen 900 may include the "Back" selector icon 402 that causes the client application 266 to return to the content selection screen 600, the content upload source screen 400, the source screen 300, or the home screen 222. In some embodiments, the identification tag generation screen 900 may include an identification tag type selector icon 904 which may enable the user to select the type, form, look, or settings of the identification tag. In response to receiving a selection of the identification tag type selector icon 904, the client application 266 may navigate the user to another screen on which the user selects the form of the identification tag. For example, the user may select between a bar code, QR code, string of character, thumbnail image, or other format in which the identification tag may be depicted. Upon receiving a selection of the "Print" selector icon 908, the client application 266 may navigate to an identification tag print order information screen 1000, as shown in FIG. 10.

Figure 10:
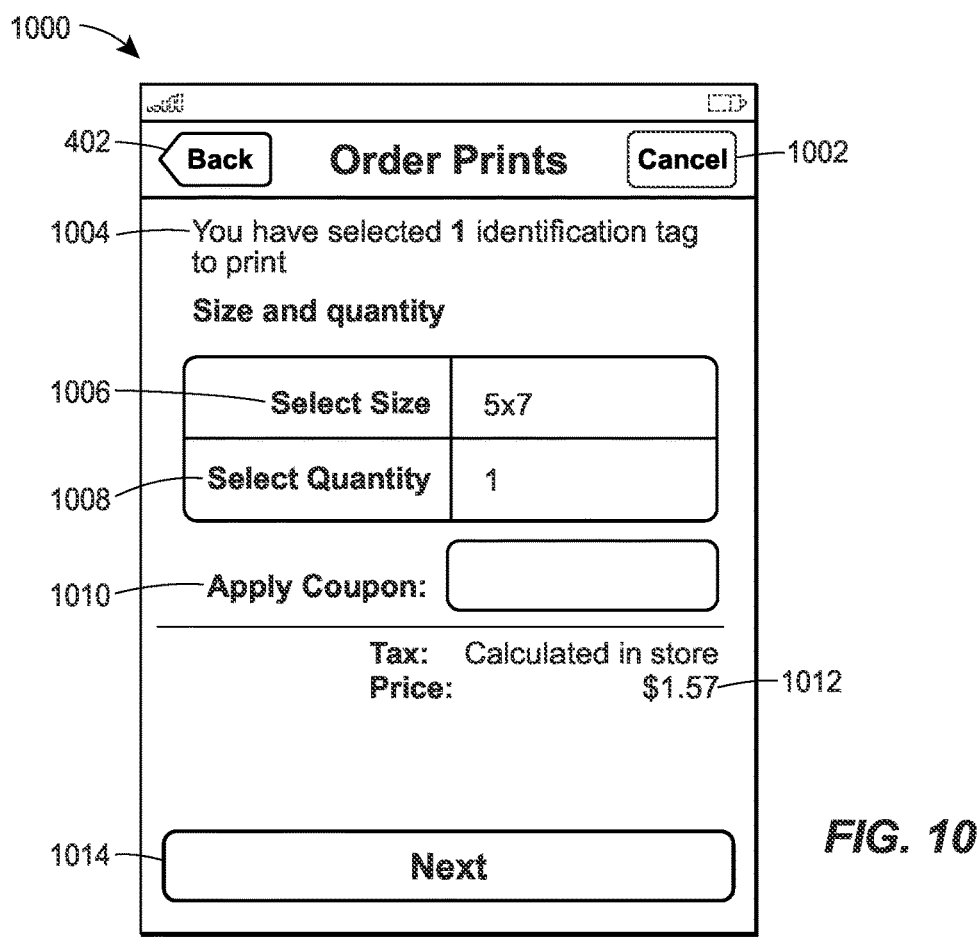
FIG. 10 illustrates an identification tag print order information screen of a client application.

FIG. 10 illustrates an identification tag print order information screen 1000 of a client application 266. The identification tag print order information screen 1000 may include the "Back" selector icon 402 that may cause the client application 266 to display the identification tag library screen to select a different identification tag for printing. In response to receiving a selection of the "Back" selector icon 402, the client application 266 may display a "Remove All Content" alert message (not shown) that notifies the user that all uploaded content will be removed if the user wishes to select new content for to upload. Similarly, if the user selects a "Cancel" selector icon 1002, the client application 266 may display a "Cancel" message alert (not shown) to confirm that the user wishes to cancel the identification tag print order. The identification tag print order information screen 1000 may include a content upload message 1004 that specifies the type of content uploaded to the proprietary server 202. Additionally, the identification tag print order information screen 1000 may include an identification tag size selector icon 1006 and an identification tag quantity selector icon 1008. In response to receiving a selection of the size selector icon 1006, the client application 266 may display the availability of one or more print size selections for the physical depiction of the identification tag. For example, upon selecting the size selector icon 1006, the client application 266 may display a selection to print the physical depiction of the identification tag on 1"×1" print, 2"×4" prints, 3"×5" prints, 4"×6" prints, 5"×7" prints, etc. Additionally, the client application 266 may display to the user a price, set by a retailer or other third party printer, for each different sized print. Upon receiving a selection for the quantity selector icon 1008, the client application 266 may display one or more quantities for which the user may select to print multiple copies of the identification tag. Based on the received size and quantity inputs of the user, the client application 266 may calculate the total price 1012 or quote (optionally including sales tax) of the print order. Moreover, in calculating the total price, the client application 266 may also include an applied coupon that the user may enter via the "Apply Coupon" field 1010. In any event, the user may select the "Next" selector icon to navigate to a printer selection screen 1100, as shown in FIG. 11, that may be displayed on the client source device 216 via the client application 266. It should be appreciated that in some embodiments, such as when the user prints the identification tags from the user's own printer, there may not be a price or quote associated with the printer order.

FIG. 11 illustrates a printer selection screen 1100 of a client application 266. The printer selection screen 1100 may include the "Back" selector icon 402 that may cause the client application 266 to display the identification tag print order information screen 1000 for the user to select a different size and/or a different quantity for the physical depiction of the identification tag. The printer selection screen 1100 may also include one or more printer selector icons 1102 that allow the user to select from a plurality of printers, such as a user's personal printer, a centralized printing location, a particular retail store (associated with a corresponding retail store selector icon 1102) from which the physical depiction of the identification tag may be printed. Each printer selector icon 1102 may include an address of the printer 1104, a distance 1106 to the printer from the current location of the client source device 216, and an estimated pickup time 1108 at which the image prints will be available for pickup at the printer of a retail store. The client application 266 may additionally select the printer for the user by using a pre-determined default retail store, automatically selecting the most proximal retail store, or using any other manner suitable to determine a retail store. Alternatively, the user may enter a city and state or a zip code into an address field 1110 to view retail stores not residing in the immediate geographical area surrounding the current location of the client source device 216. For example, in response to receiving a zip code, the client application 266 displays a list of retail store locations within the received zip code. In any event, when the user selects a particular printer selector icon 1102, the client application may navigate the user to a print order confirmation screen 1200, as shown in FIG. 12, that may be displayed on the client source device 216.

Figure 12:
FIG. 12 illustrates an identification tag print order confirmation screen of a client application.

FIG. 12 illustrates an identification tag print order confirmation screen 1200 of a client application 266. The print order confirmation screen 1200 may include the "Back" selector icon 402 that may cause the client application 266 to display the printer selection screen 800 for the user to select a different printer selector icon 1102 associated with a printer and/or retail store location from which to print the identification tags. Moreover, the identification tag print order confirmation screen 1200 may include entry fields for the user to enter biographical information, such as a first name entry field 1202, a last name entry field 1204, a telephone number entry field 1206, and an email address entry field 1208. The client application 266 may associate the entered biographical information with the print order so that the retail store may release the identification tag prints to the appropriate customer. The identification tag print order confirmation screen 1200 may also include the selected printer that the user selected on the printer selection screen 1100 of FIG. 11. If the user wishes to change the printer or location of the pick-up retail store, the user may select the printer selector icon 1102, and in response, the client application 266 may redirect the user back to the printer selection screen 1100 of FIG. 11. Referring back to FIG. 12, the identification tag print order confirmation screen 1200 may also include an instructional area 1210 that may inform the user of a terms of use agreement or privacy policy information. The user may agree to the terms of use or the privacy policy by clicking a check box, etc. After the user confirms the correctness of the entered biographical information, the printer/pick up retail store location, and the instructional area 1210, the user may select a "Submit" selector icon 1212 that finalizes and transmits the identification tag print order to the proprietary server 202. In some embodiments, the client application 266 does not require the user to log onto the proprietary network 130 or the client application 266 to complete the print order, but rather use the user's biographical information to associate the print order to the user.

Figure 13:
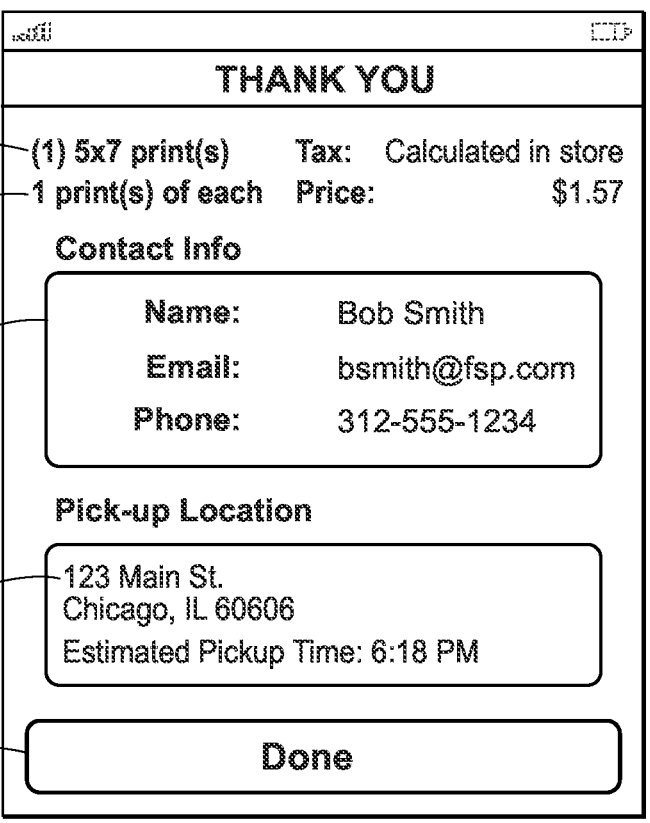
FIG. 13 illustrates a print order confirmation receipt screen of a client application.

FIG. 13 illustrates a print order confirmation receipt screen 1300 of a client application 266. In response to receiving a confirmation from the proprietary server 202 that the identification tag print order successfully was entered, the client application 266 may display a print order confirmation receipt screen 1300, as shown in the FIG. 13, that may be displayed to the user via the client source device 216. The print order receipt screen 1300 may include the size of print 1002, the quantity of print 708 ordered, the total price 1012, the user's biographical information 1302, and/or the pick-up retail store location of the print order. The user may select the "Done" selector icon 1304 when finished reviewing the print order receipt, and in response, the client application 266 may redirect the user to the home screen 222 of FIG. 2, content source screen 300 of FIG. 3, etc.

Figure 14:
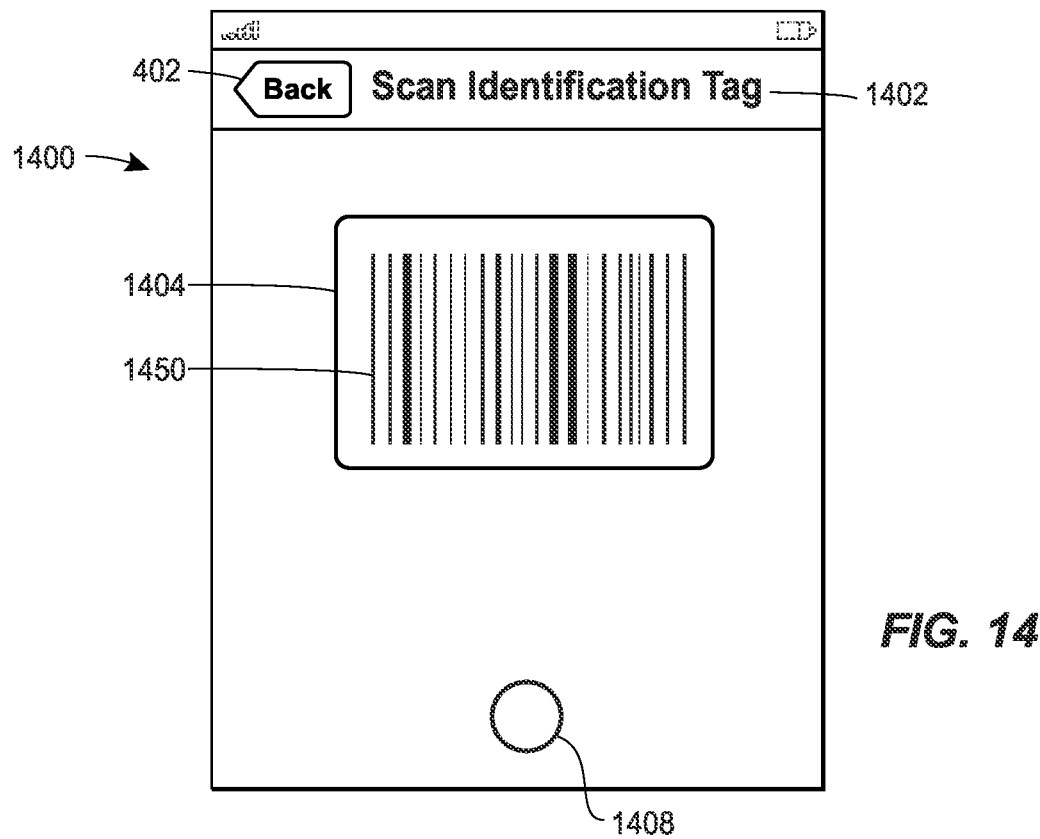
FIG. 14 illustrates an identification tag scan screen of a client application.

FIG. 14 illustrates an identification tag scan screen 1400. The identification tag scan screen 1400 may include may include a "Back" selector icon 402 that causes the client application 266 to return to the content source screen 300 or the home screen 222. It should be appreciated that the identification tag scan screen 1400, and all other subsequent screens of the client application 266 accessed from the identification tag screen 1400, may typically be accessed on the client destination device 218. In some embodiments, the identification tag scan screen 1400 may be a digital content capture application (e.g., a camera and/or microphone of the client destination device 218). The identification tag scan screen 1400 may include an icon 1402 instructing a user to capture an image or video of the identification tag 1450. In some embodiments, the identification tag scan screen 1400 may include an image boundary 1404 which serves to provide a template for a user to capture an image or video of the identification tag 1450 within the image boundary 1404 for the purpose of detecting the identification tag 1450. The identification tag scan screen 1400 may include an identification tag scan button 1408 that causes the client destination device 218 to capture/scan a the identification tag 1450. For example, the identification tag scan button 1408 may cause the client application 266 to execute an identification tag scanning routine 280 that coordinates with an identification tag scanner 257 to capture an image or video of the identification tag, or otherwise scan the identification tag, and provide the data to the client application 266. The client application 266 may display the scan/image data from the identification tag scanning routine 280 on an identification tag capture screen (not shown). In response to receiving the command to display the identification tag capture screen, the client application 266 may provide a selection to rescan/capture a new image or use the currently displayed image data. In response to receiving the command to rescan/capture a new image (e.g., a blurry previously captured image, scanning error, etc.), the client application 266 may again execute the identification tag scanning routine 280 that cooperates with the identification tag scanner 257 to rescan/capture another image of the identification tag. Alternatively, the selection to use the currently scanned/captured image (e.g., the quality or the subject matter of the currently captured image is acceptable to the user) may cause the client application 266 to navigate to an identification tag upload screen 1500, as shown in FIG. 15, that may be displayed on the client destination device 218 via the client application 266 (described below).

Figure 15:
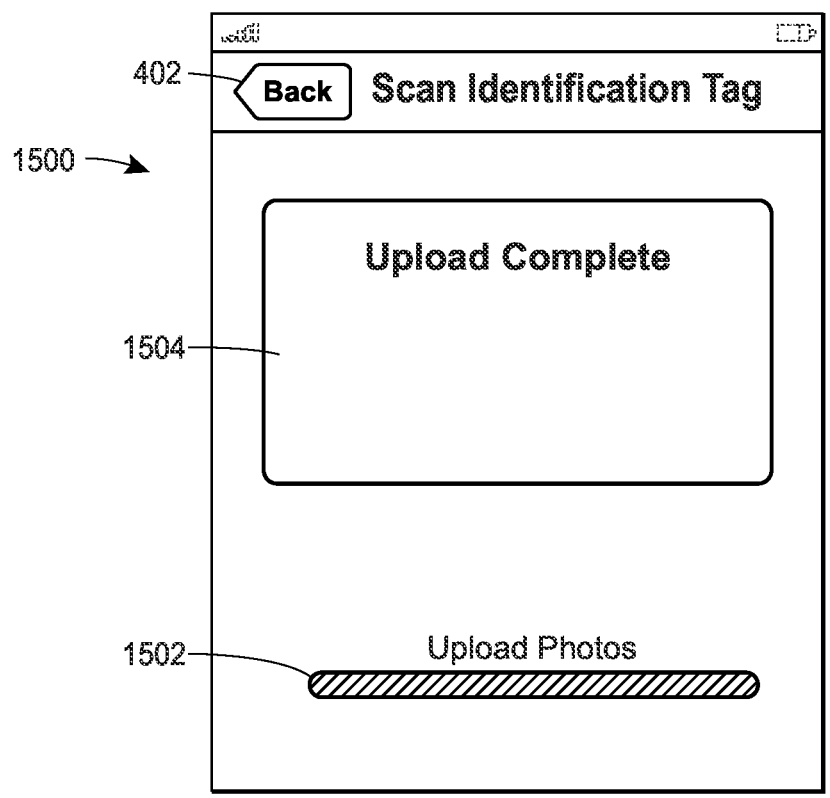
FIG. 15 illustrates an identification tag recognition screen of a client application.
Figure 16:
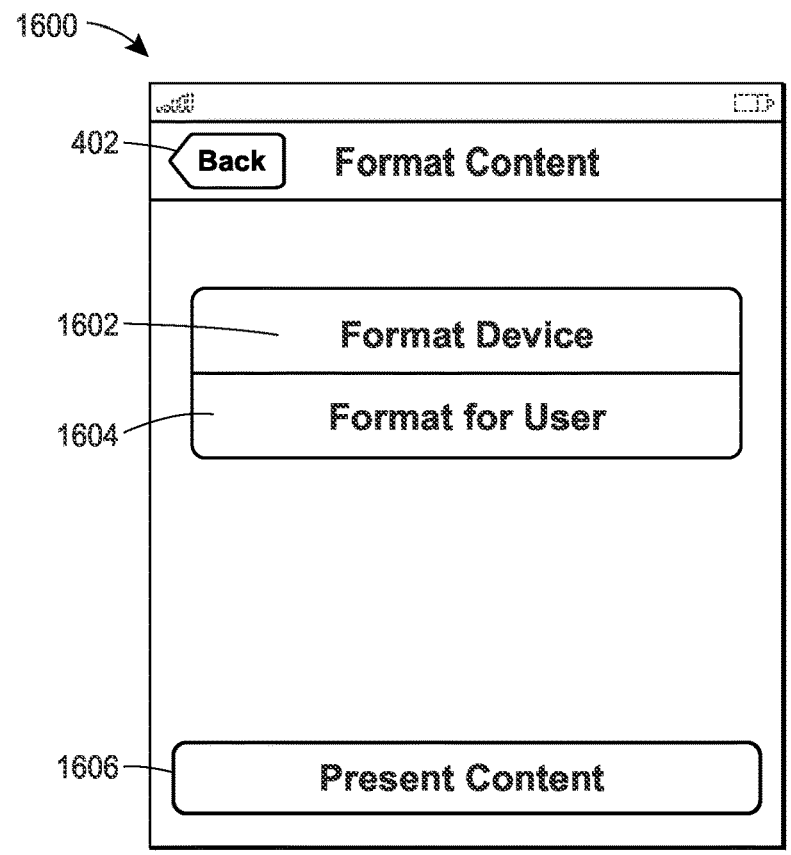
FIG. 16 illustrates a content formatting screen of a client application.

FIG. 15 illustrates an identification tag recognition screen 1500 of a client application 266. While uploading or transmitting the captured image of the identification tag to the proprietary server 202, an identification tag upload screen 1500, as shown in FIG. 15, may display a status bar 1502 that represents the progress of the image upload to the proprietary server 202 on the client destination device 218 via the client application 266. If the user wishes to cancel the content transfer to the proprietary server 202, the "Back" selector icon 402 may be selected, and the client application 266 may interrupt the uploading process and display a "Cancel Upload" alert message. The "Cancel Upload" alert message (not shown) may request confirmation from the user to abort the upload of the image of the identification tag to the proprietary server 202. In any event, if the "Back" selector icon 402 is not selected, the identification tag upload screen 1500 may continue to display image uploading progress via the status bar 1502 until successfully transferred to proprietary server 202. In response to receiving a confirmation that the image of the identification tag successfully uploaded to the proprietary server 202, the client application 266 may display an "Upload Complete" alert message 1504. The client application 266 may direct the user to a content formatting screen 1600, as shown in FIG. 16, that may be displayed on the client destination device 218 via the client application 266. While uploading the scan of the identification tag, the client application 266 may execute the identification tag recognition routine 282 to identify the content, stored on the database 146, to which the scanned identification tag corresponds. In an embodiments in which the image of identification tag is not successfully uploaded to the proprietary server, the client application 266 may display an "Unsuccessful Upload" alert message (not shown), indicated to the user that the image/video of the identification tag was not uploaded to the proprietary server. In some embodiments, the client application may display an alert to the user indicating why the image/video of the identification tag was not uploaded (e.g., "Unknown Identification Tag," "No Content Found," "Image Too Quality Low," "Insufficient Image Resolution," "Uploaded Content Not Supported," etc.), and may provide instructions to the user on how to correct the image/video (e.g., "Please Recapture Image With Brighter Light", "Please Center Identification Tag," etc.). After the client application has displayed an alert message to the user that the image/video of the identification tag was not uploaded, the client application 266 may navigate back to the identification tag scan screen 1400 in order to rescan the identification tag.

FIG. 16 illustrates a content formatting screen 1600. The content formatting screen 1600 may include the "Back" selector icon 402 that may cause the client application 266 to return to and display a previous screen (e.g., the identification tag scan screen 1100, the source screen 300, the home screen 222, etc.). After the content corresponding to the scanned identification tag has been determined/located, the content may be prepared and formatted in preparation for being presented on the client destination device 218. The content formatting screen 1600 may include a format content for device selector icon 1602, a format content for user icon 1604, and a present content icon 1606. In response to receiving a selection of the format content for device selector icon 1602, the client application 266 may automatically format the content based on the client destination device 218 on which the content is attempting to be accessed. In some embodiments, after the user has selected the device selector icon 1602 and/or the format content for user icon 1604, and the client destination device 218 has been formatted, the client application 266 may automatically present the content without further input/action from the user. In some embodiments, receiving a selection of the format content for device selector icon 1602 may cause the client application 266 direct the user to an additional display screen (not shown) in which the user may manually enter the type of device (e.g., a mobile phone, virtual reality headset, TV, computer, interactive VR environment, etc.) on which to generate the content or may select from a list or drop down menu of supported client destination devices (e.g., iPhone 7, iPhone X, Galaxy 7, 13" MacBook pro, Oculus Rift, etc.). Examples of this formatting include adding subtitles, adjusting an aspect ratio, adjusting a color ratio, adjusting a brightness level, adjusting a sound level, or formatting content to compensate for a visual, audio, or other cognitive condition of the user. In response to receiving a selection of the format content for a format content for user icon 1604, the client application 266 may navigate the user to an additional display screen (not shown) in which the user may manually enter, select from a list, or select from a drop down menu, any specific characteristics that would require adjusting/reformatting for the user to properly experience the content. For example, the volume level of the audio/video content to be presented may be adjusted to compensate for a hearing impaired/sensitive user. Upon receiving a selection of the present content icon 1606, or after the client destination device 218 has been properly formatted as a result of selecting the format content for device selector icon 1602 and/or the format content for user icon 1604, the client application 266 may generate and present the content, as shown in FIG. 17, on the client destination device 218 via the client application 266.

Figure 17:
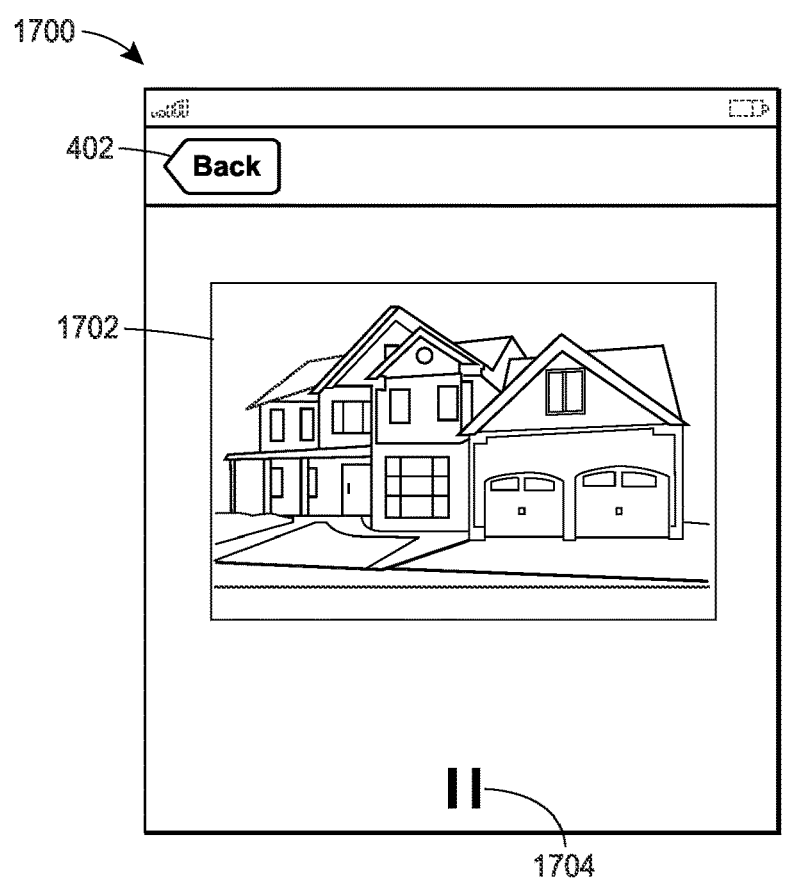
FIG. 17 illustrates a content presentation screen of a client application.

FIG. 17 illustrates a content presentation screen 1700 of a client application 266. The content presentation screen 1700 is configured to present content 1702 on the client destination device 218. The content presentation screen 1700 may include the "Back" selector icon 402 that may cause the client application 266 to return to and display a previous screen (e.g., the identification tag source scan screen 1400, the source screen 300, the home screen 222, etc.). The content presentation screen 1700 may include a pause icon 1704 to pause the content/freeze the current frame of the content being presented on the client destination device 218. In some embodiments, such as a video, audio recording, or interactive event, after the content has completed being presented the client application 266 may return to and display a previous screen (e.g., the identification tag scan screen 1100, the source screen 300, the home screen 222, etc.). In some embodiments, after the content has completed being presented, the content presentation screen 1700 may display a replay icon (not shown) to regenerate/replay the content from the beginning.

Figure 18:
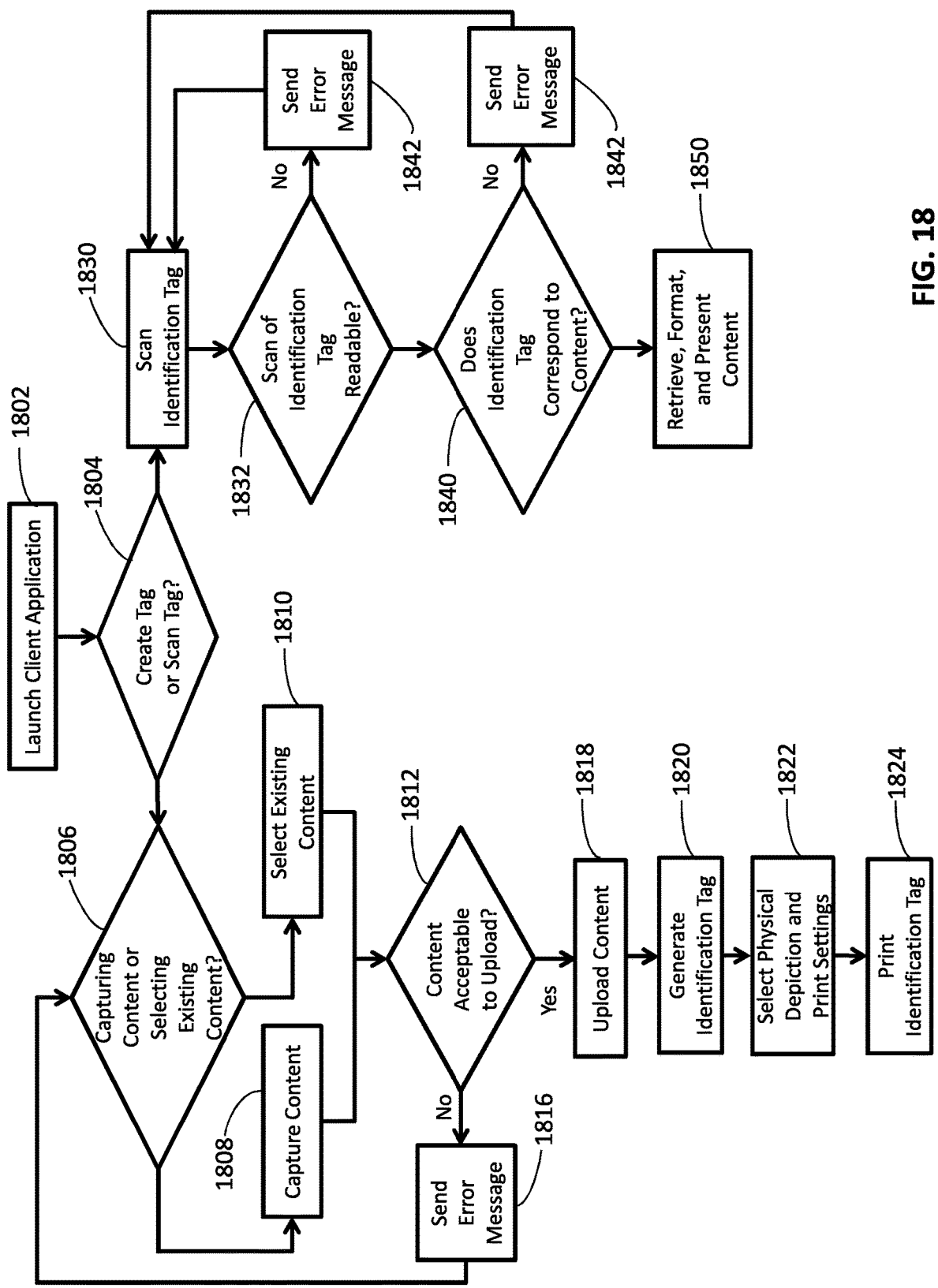
FIG. 18 illustrates an exemplary method of implementing a content identification tag system in which media content is uploaded, an identification tag corresponding to the content is generated, a physical depiction of the identification tag is printed, and the physical depiction of the identification tag is scanned in order to access the uploaded content.

FIG. 18 illustrates an exemplary method 1800 of implementing a content identification tag system in which media content is uploaded, an identification tag corresponding to the content is generated, a physical depiction of the identification tag is printed, and an image of the physical depiction of the identification tag is scanned in order to access the uploaded content. The method 1800 may be implemented as described above with FIGS. 1A, 1B, 1C, 1D, 1E, and 2-17. Accordingly, the method 1800 may be partially or completely implemented over a network (e.g., the network 130 of FIG. 1A).

In the method 1800, a client application (e.g., the client application 266 of FIG. 1D) is launched from a client device (e.g., the client source device 216 and/or the client destination device 218 of FIG. 1A) (block 1802). The client application may display one or more images via a user interface (e.g., the user interface 240 of FIG. 1D) prompting a user to select between creating an identification tag or scanning an existing identification tag (block 1804). When a user selects to create an identification tag, the method proceeds to block 1806. When a user selects to scan an existing identification tag, the method proceeds to block 1830.

In response to selecting to create an identification tag via the user interface (e.g., the user interface 240 of FIG. 1D), a proprietary server (e.g., the proprietary server 202 of FIG. 1A) may transmit instructions back to the client device that cause the client application to display one or more images prompting a user to select between capturing new content or retrieving existing content (block 1806). When a user selects to capture content, the method proceeds to block 1808. When a user selects to retrieve existing content, the method proceeds to block 1810.

In response to selecting to capture content, the client application may execute a content capture routine (e.g., the content capture routine 272 of FIG. 1D) (block 1808). The content capture routine may correspond to using a client source device (e.g., the client source device 216 of FIG. 1A), or another device connected to the client source device such as a content capture device (e.g., the client capture device 256 of FIG. 1D), to capture/record an image, video, audio, and/or other forms of multimedia. After the content has been captured/recorded, the method 1800 proceeds to block 1812. In some embodiments, a copy of the captured content may be saved locally in a data storage (e.g., the data storage 262 of FIG. 1D) on the client source device.

In response to selecting to upload existing content, the client application may retrieve content from a local database (e.g., the local database 239 of FIG. 1D) of the client source device (block 1810). In some embodiments, a user may select from a plurality of content types including images, videos, audio recordings, haptic patterns, digital renderings of traversable environments, etc. After the content has been selected by a user, the method proceeds to block 1812. In some embodiments, the client application may retrieve content from a specified remote server (e.g., the proprietary server 202, the central processing system 140 of FIG. 1A, the facility server 126 of FIG. 1A, a cloud server, a social networking server, a third party server, or any other server that may store content).

After capturing, recording, selecting, or otherwise accessing the desired content to upload, the client application may execute a content upload routine (e.g., the content upload routine 274 of FIG. 1D) to attempt to upload and store the content to the proprietary server (block 1812). In some embodiments the content may be stored in a facility server of a retail store (e.g., the facility server 126 of FIG. 1A) or in a database of a central processing system (e.g., the database 146 of the central processing system 140 of FIG. 1A). In some embodiments, the content upload routine may include the proprietary server analyzing the content to determine whether the content, more specifically the electronic file and/or data representing the content, is an acceptable format and/or compatible with the hardware and/or systems of the proprietary server. In some embodiments, the proprietary server may reformat, convert, or otherwise modify the content to be storable and/or otherwise compatible with the hardware and/or software of the proprietary server. For example, the uploaded content may include multiple images of multiple sizes, resolutions, etc. that may require processing before storing the content. The content upload routine may crop, resize, or perform any other content processing technique to properly store the content on the proprietary server. In some embodiments, the proprietary server may scan the content to ensure that the file/data is not corrupt, infected with a virus or malware, or otherwise damaged. When the proprietary server determines the uploaded content is compatible, acceptable, and/or safe, the method proceeds to block 1818. When the proprietary server determines content is not compatible, acceptable, and/or safe, and cannot be modified to become acceptable/compatible/safe, the proprietary server transmit instructions back to the client source device that cause the client application to display one or more images indicating that the content was unable to be uploaded (block 1816) and the method may return to block 1806 so that different content may be captured or selected. In some embodiments, the message transmitted back to the client source device may indicate the nature of the error with uploading the content and/or may provide instructions for remedying the content so that it can be successfully uploaded to the proprietary server.

After the proprietary server determines the content is suitable to be uploaded, the content is uploaded and stored on the proprietary server (Block 1818). In some embodiments, after the content is successfully upload, the proprietary server transmits a message back to the client source device indicating the content was successfully uploaded to the proprietary server (Block 1818). The proprietary server may store the uploaded content in a database (e.g., the database 239 of FIG. 1A), another server (e.g., the facility server 126 of the retail store), or in a central processing system (e.g., the central processing system 140). In response to receiving a confirmation that the content successfully uploaded to the proprietary server, the client application may display an "Upload Complete" alert message to the user via a user interface (e.g., the user interface 240 of FIG. 1D) before proceeding to block 1820.

In response to storing the content on the proprietary server, the proprietary server executes an identification tag generation routine (e.g., the identification tag generation routine 278 of FIG. 1D) to create an identification tag corresponding to the uploaded content (block 1820). In some embodiments, the proprietary server may also include a memory register containing a registry of each individual identification tag that corresponds to specific stored content, and/or where that content is stored within the database or proprietary server. In some embodiments, the proprietary server may generate a string of numbers and/or characters corresponding to the stored content. In some embodiments, a certain string of characters may designate the type of content. For example, an identification tag of "IMG764242342" may correspond to content that is an image because the identification tag contains the string of characters "IMG." In some embodiments, the identification tag may contain a string of characters corresponding to the uploader/owner of the content, or a user/customer profile associated with the uploader/owner. For example, if an individual named "John Smith" has uploaded the content, the identification tag may be "JohnSmithIMG00001". In some embodiments, the user may select the type, form, look, etc. of the identification tag.

After generating the identification tag, the proprietary server may transmit one or more prompts to a user to select one or more settings corresponding to printing a physical depiction of the identification tag (block 1822). In some embodiments, for example, a user may select a location from which to print the physical depiction of the identification tag (e.g., a user's personal printer, a retail store, a warehouse facility, etc.) a quantity of physical prints, the size of the physical print, type and/or size of material on which the identification tag will be printed on (e.g., paper, plastic, metal, cloth, etc.), and/or any other property pertaining to the printing of the identification tag. In determining available printing devices to print from, a GPS unit of the client source device (e.g., the GPS unit 244 of FIG. 1D) may be utilized to determine the closest available printing device, retail stores in proximate location to the user, or a location for delivering the identification tags. In response to receiving a selection of the print settings, the client application may determine whether a default pickup retail store has been selected. The default pickup retail store may be a retail store that the user most often frequents, a retail store that is closest to the user's home or work, etc. If the user has not determined the default pickup retail store, the client application may execute a location awareness routine (e.g., the location awareness routine 276 of FIG. 1D) that coordinates with the GPS unit to geo-locate the current location of the client source device. If the current location of the client source device is available, the client application may determine a list of proximal retail stores to the current location and may display only the retail stores that include the shortest distance to the current location of the client source device. If the current location is not available, the client application may only receive address information from the user, such as receiving an address information, either contained in a user profile or manually entered by the user via an address field prompt on a retail store selection screen. In some embodiments, using the location associated with the entered address information, the client application may determine a list of proximal retails stores to the location associated with the entered address information and may display only the retail stores that include the shortest distance to the location associated with the entered address information. The user may select a desired retail store from the displayed retail stores via a retail store selector icon, for example.

Once the printing setting of the physical depiction of the identification tag have been selected and transmitted to the proprietary server, the proprietary server may submit the print order to a printer (e.g., the printer 145 of FIG. 1A) and the physical depiction of the identification tag is printed (1824). In some embodiments, when the print order is successfully received by the proprietary server, the client application may receive a message indicative of a print order receipt/confirmation and may display the receipt to the user. In embodiments in which the identification tag is printed at a remote printer (e.g., a warehouse, retail store, etc.), the identification tag may be shipped to the user or the user may be required to pick up the identification tags from a remote location (e.g., a retail store, centralized pick-up location, designated kiosk, etc.), such as the default retail store or the retail store selected at block 1822.

At a time after the physical depiction of the identification tag is printed, a user (or a plurality of users, who may be the same or a different user than previously referenced) may scan an existing identification tag, the proprietary server may transmit instructions back to a client destination device (e.g., the client destination device 218 of FIG. 1E) that cause the client application to display one or more images prompting a user to scan the identification tag (block 1830). The proprietary server may transmit instructions back to the client destination device that cause the client application to execute a scan identification tag routine (e.g., the scan identification tag routine 280 of FIG. 1E) in order to, for example, capture an image or video of the physical depiction of the identification tag.

The scan of the physical depiction of the identification tag is uploaded to the proprietary server, and the proprietary server or client application executes an identification tag recognition routine (e.g., the identification tag recognition routine 282 of FIG. 1E) to analyze the scan to determine if an identification tag can be recognized in the scan (block 1832). After receiving the scan, the proprietary server may determine whether the scan is of sufficient quality to identify certain visual indicators, corresponding to the identification tag, that may be depicted in the scan. The proprietary server may employ one or more digital image analysis techniques, algorithms, routines, or the like to determine whether the scan depicts an identification tag, as well as assess and consider image characteristics such as sharpness, noise, range, tone reproduction, contrast, color accuracy, distortion, vignetting, exposure accuracy, lateral chromatic aberration (LCA), lens flare, color moire, and/or artifacts. If the proprietary server determines that the scan is of sufficient image quality, then the method 1800 proceeds to block 1840.

When the proprietary server cannot decipher an identification tag in the scan, for example because the scan is of insufficient quality, the proprietary server may transmit instructions back to the client destination device that cause the client application to display one or more images indicating that the scan could not be processed (block 1834). In some embodiments, after the proprietary server determines that the captured scan is of insufficient quality, the proprietary server may transmit a message using the client application to request a new scan be uploaded. Further, in some embodiments the message may include instructions for correcting the image or for properly capturing a scan that is of sufficient quality. Accordingly, the method 1800 may return to block 1830 and repeat blocks 1830-1832 so that a different scan of the identification tag can be captured, uploaded, and analyzed.

After the proprietary server determines the scan of the physical depiction of the identification tag is acceptable, the proprietary server then determines what content, stored in the database or on the proprietary server, corresponds to the scanned identification tag (block 1840). To determine the content correspond to the identification tag, the proprietary server may execute an identification tag recognition routine (e.g., the identification tag recognition routine 282 of FIG. 1E) to analyze the captured scan to identify a set of visual identifiers that may be depicted in the captured scan, such as one or more graphical objects, logos, text, barcodes, labels, and/or the like that are the identification tag itself or correspond to the identification tag. It should be appreciated that the proprietary server may employ any type of image analysis technique, including an object recognition technique(s), in analyzing the captured scan of the identification tag. Thus, in analyzing the captured scan, the proprietary server may determine whether any identified visual identifiers match or are similar to the visual identifiers for an identification tag stored on the proprietary server. In some embodiments, the proprietary server may compare the identified visual identifier(s) to the visual identifier(s) for the identification tag, wherein the proprietary server may calculate a similarity score based on the comparison, and deem that the visual identifier(s) is a "match" if the calculated similarity score meets or exceeds a threshold amount or value. For example, if the proprietary server calculates a similarity score of 85% and the threshold amount is 75%, then the proprietary server may deem that the visual identifier(s) in the captured scan matches those associated with the identification tag. It should be appreciated that in comparing the visual identifier(s), the proprietary server may employ any type of algorithm, calculation, technique, or the like. In determining or identifying the details or information, the proprietary server may perform one or more optical character recognition (OCR) techniques. For example, when the identification tag is a barcode, the proprietary server may perform an OCR technique on the barcode that may be depicted in the captured scan, wherein the output of the OCR technique corresponds to identifying the content corresponding to the identification tag. For example, a user may have a unique logo and position thereof, label shape/size, and color pattern for its identification tags. In another example, the identification tag may correspond to a uniform resource identifier (URI) to obtain the location of the content on the proprietary server, and the proprietary server may transmit a URI to a remote server (e.g., the proprietary server) and, in response, the remote server may transmit the content associated with the URI. When the proprietary server does not recognize the identification tag and/or cannot locate content corresponding to the scanned identification tag, the proprietary server may transmit a message back indicating an error (block 1842), and the method may return to block 1830 so that the identification tag, or a different identification tag, can be rescanned, uploaded, and analyzed. When the proprietary server determines the content stored on the proprietary server corresponding to the identification tag, the method 1800 proceeds to block 1850.

After the proprietary server determines the content corresponding to the scanned identification tag, the proprietary server transmits instructions back to the client destination device that cause the client application to retrieve the content, format the content for the specific device and/or user, and present the content using the client destination device (block 1850). Upon retrieving the content from the proprietary server, the client application 266 may execute a content presentation routine (e.g., the content presentation routine 284 of FIG. 1E) to format and present the retrieved content on the client destination device, or a component thereof and/or connected to the client destination device. For example, the retrieved content may require adjustments in size, resolution, volume, brightness, depth, haptic intensity, etc. before presenting the content to the user. For example, in embodiments in which the content is an image or other visual content, the content presentation routine may crop, resize, or perform any other image processing technique to uniformly display the images to the user in a grid, column, etc. pattern. In some embodiments, the content presentation routine may modify the retrieved content to compensate for a user's specific preferences or conditions. For example, the content presentation routine may modify the color scheme of visual content to be viewed by a user who is colorblind, may modify visual content to coincide with a user's specific vision prescription to maximize clarity, may adjust light exposure and speed as a preventive measure for user's with epilepsy, and/or may adjust sound levels of audio content for user's who are hearing impaired. In some embodiments in which the content includes audio, for example, subtitles may be added.

In some embodiments, the method 1800 does not include blocks 1806-1822 because the identification tag attempting to be scanned is a pre-existing identification tag. For example, in such embodiments, the identification tag may correspond to a well-known and/or commercially available painting, song, piece of art, concert, sporting event, or other environment, and the owner of such content may mass-produce and sell an identification tag corresponding to that content. In some embodiments, the identification tag may be generated and/or detected using machine learning techniques, such as cognitive learning, deep learning, combined learning, heuristic engines and algorithms, and/or pattern recognition techniques. For example, the proprietary server, the client application, a processor, etc. may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, video, audio, mobile device, retailer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the retailer database, a third-party database, and/or other data.

In one embodiment, a processor (and/or machine learning or heuristic engine or algorithm discussed herein) may be trained by providing it with a large sample of content and/or user data with known characteristics or features, such as historical vehicle data and/or past auto claim data. Based upon these analyses, the processing element may learn how to identify characteristics and patterns that may then be applied to analyzing user device details, user device sensors, geolocation information, image data, the retailer database, a third-party database, and/or other data. For example, the processing element may learn, with the user's permission or affirmative consent, to identify content and/or identification tags, and/or learn to identify user characteristics and/or preferences.

Although the above text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A computer-implemented method of ordering unique identification tag prints on a graphical user interface (GUI) of a client device, comprising:
   receiving, via the GUI, a user selection of one or more digital media;
   in response to a user upload selection received via the GUI, transmitting the one or more digital media to a remote computing device;
   receiving, via the GUI, a user identification tag print selection corresponding to the one or more digital media;
   transmitting the user identification tag print selection to the remote computing device; and
   displaying, on the GUI, a tag print order confirmation message including a textual or graphical coding scheme associating the tag print order confirmation message to the one or more digital media at the remote computing device,
   wherein the tag print order confirmation message does not include the digital media, and
   wherein the textual or graphical coding scheme includes an identifier of the user.

2. The computer-implemented method of claim 1, wherein receiving, via the GUI, the user selection of the one or more digital media includes one or both of (i) capturing new content, and (ii) retrieving existing content.

3. The computer-implemented method of claim 1, wherein in response to the user upload selection received via the GUI, transmitting the one or more digital media to the remote computing device includes displaying a content upload screen on the GUI, including a status bar that represents a progress of the transmitting of the one or more digital media to the remote computing device.

4. The computer-implemented method of claim 1, further comprising:
   displaying, on the GUI, a tag generation screen enabling the user to select a type, a form, a look, or a setting of the unique identification tag.

5. The computer-implemented method of claim 1, further comprising:
   in response to receiving, via the GUI, the user identification tag print selection corresponding to the one or more digital media, wherein the user identification tag print selection includes a size of a physical print of an identification tag, a quantity of physical prints of the identification tag, a location from which to print the physical print of the identification tag or from which to obtain the location of the digital media on the remote computing device, or user contact information of the unique identification tag, calculating a total price based on the size, the quantity, the location, or the user contact information of the unique identification tag.

6. The computer-implemented method of claim 1, further comprising:
displaying, on the GUI, a printer selection screen for enabling the user to print a physical depiction of the unique identification tag, the printer selection screen including one or more printer selector icons that correspond to a respective printer.

7. The computer-implemented method of claim 1, wherein transmitting the user identification tag print selection to the remote computing device causes a printer connected to the remote computing device to print the unique identification tag.

8. The computer-implemented method of claim 7, further comprising:
shipping the printed unique identification tag to the user.

9. The computer-implemented method of claim 1, wherein the textual or graphical coding scheme includes a uniform resource identifier associating the tag print order confirmation message to the one or more digital media at the remote computing device.

10. The computer-implemented method of claim 1, wherein displaying, on the GUI, the tag print order confirmation message includes displaying the location and a pick up time.

11. A computing system for generating a unique identification tag print, the system comprising:
one or more processors; and
a memory including computer-executable instructions that, when executed by the one or more processors, cause the computing system to:
receive, via a graphical user interface (GUI), a user selection of one or more digital media;
transmit the one or more digital media to a remote computing device in response to receiving a user upload selection via the GUI;
receive, via the GUI, a user identification tag print selection corresponding to the one or more digital media;
transmit the user identification tag print selection to the remote computing device; and
display, on the GUI, a tag print order confirmation message including a textual or graphical coding scheme associating the tag print order confirmation message to the one or more digital media at the remote computing device,
wherein the tag print order confirmation message does not include the digital media, and
wherein the textual or graphical coding scheme includes an identifier of the user.

12. The computing system of claim 11, the memory including further computer-executable instructions that, when executed by the one or more processors, cause the computing system to:
one or both of (i) capture new content, and (ii) retrieve existing content.

13. The computing system of claim 11, the memory including further computer-executable instructions that, when executed by the one or more processors, cause the computing system to:
display content upload screen on the GUI, including a status bar that represents a progress of the transmitting of the one or more digital media to the remote computing device.

14. The computing system of claim 11, the memory including further computer-executable instructions that, when executed by the one or more processors, cause the computing system to:
display, on the GUI, a tag generation screen enabling the user to select a type, a form, a look, or a setting of the unique identification tag.

15. The computing system of claim 11, the memory including further computer-executable instructions that, when executed by the one or more processors, cause the computing system to:
calculate a total price based on a size, a quantity, a location, or a user contact information of the unique identification tag, wherein the user identification tag print selection includes the size of a physical print of an identification tag, the quantity of physical prints of the identification tag, the location from which to print the physical print of the identification tag or from which to obtain the location of the digital media on the remote computing device, or the user contact information of a tag.

16. The computing system of claim 11, the memory including further computer-executable instructions that, when executed by the one or more processors, cause the computing system to:
display, on the GUI, a printer selection screen for enabling the user to print a physical depiction of the unique identification tag, the printer selection screen including one or more printer selector icons that correspond to a respective printer.

17. A non-transitory computer readable medium storing program instructions that when executed, cause a computer system to:
receive, via a GUI, a user selection of one or more digital media;
transmit the one or more digital media to a remote computing device in response to receiving a user upload selection via the GUI;
receive, via the GUI, a user identification tag print selection corresponding to the one or more digital media;
transmit the user identification tag print selection to the remote computing device; and
display, on the GUI, a tag print order confirmation message including a textual or graphical coding scheme associating the tag print order confirmation message to the one or more digital media at the remote computing device,
wherein the tag print order confirmation message does not include the digital media, and
wherein the textual or graphical coding scheme includes an identifier of the user.

18. The non-transitory computer readable medium of claim 17, including further program instructions that when executed, cause a computer system to:
display, on the GUI, a tag generation screen enabling the user to select a type, a form, a look, or a setting of a unique identification tag.

19. The non-transitory computer readable medium of claim 17, including further program instructions that when executed, cause a computer system to:
calculate a total price based on a size, a quantity, a location, or a user contact information of the unique identification tag, wherein the user identification tag print selection includes the size of a physical print of an identification tag, the quantity of physical prints of the identification tag, the location from which to print the physical print of the identification tag or from which to obtain the location of the digital media on the remote computing device, or the user contact information of a tag.

20. The non-transitory computer readable medium of claim 17, including further program instructions that when executed, cause a computer system to:
   display, on the GUI, a printer selection screen for enabling the user to print a physical depiction of a unique identification tag, the printer selection screen including one or more printer selector icons that correspond to a respective printer.

* * * * *